US011503819B2

(12) United States Patent
Taylor et al.

(10) Patent No.: US 11,503,819 B2
(45) Date of Patent: Nov. 22, 2022

(54) APPARATUS AND METHOD OF USE FOR AN AUTOMATED MOSQUITO SALIVARY GLAND EXTRACTION DEVICE

(71) Applicants: Sanaria Inc., Rockville, MD (US); The Johns Hopkins University, Baltimore, MD (US)

(72) Inventors: Russell H. Taylor, Severna Park, MD (US); Gregory Chirikjian, Towson, MD (US); Iulian Iordachita, Lutherville, MD (US); Henry Phalen, Baltimore, MD (US); Hongtao Wu, Baltimore, MD (US); Mengdi Xu, Pittsburgh, PA (US); Shengnan Lu, Beijing (CN); Michael Aaron Pozin, Lincolnshire, IL (US); Jin Seob Kim, Ellicott City, MD (US); Can Kocabalkanli, Baltimore, MD (US); Balazs Vagvolgyi, Baltimore, MD (US); Brian K. Chirikjian, Towson, MD (US); Joshua Davis, Columbus, OH (US); Ting Da, Xi'an (CN); John S. Chirikjian, Towson, MD (US); Sumana Chakravarty, Derwood, MD (US); Stephen Hoffman, Gaithersburg, MD (US)

(73) Assignees: Sanaria Inc., Rockville, MD (US); The Johns Hopkins University, Baltimore, MD (US)

( * ) Notice: Subject to any disclaimer, the term of this patent is extended or adjusted under 35 U.S.C. 154(b) by 0 days.

(21) Appl. No.: 16/995,164

(22) Filed: Aug. 17, 2020

(65) Prior Publication Data

US 2021/0045375 A1 Feb. 18, 2021

Related U.S. Application Data

(60) Provisional application No. 62/888,160, filed on Aug. 16, 2019.

(51) Int. Cl.
*A61B 10/00* (2006.01)
*A01M 1/02* (2006.01)
*B01L 9/00* (2006.01)

(52) U.S. Cl.
CPC ....... *A01M 1/026* (2013.01); *A01M 2200/011* (2013.01)

(58) Field of Classification Search
CPC . B01L 2200/025; B01L 2400/049; B01L 9/52
USPC .................................................. 422/536, 561
See application file for complete search history.

(56) References Cited

U.S. PATENT DOCUMENTS

2004/0087112 A1* 5/2004 Liu ........................ B23K 26/40
438/460

* cited by examiner

*Primary Examiner* — Natalia Levkovich
(74) *Attorney, Agent, or Firm* — Sterne, Kessler, Goldstein & Fox P.L.L.C.

(57) ABSTRACT

Systems and methods for providing a combined mosquito staging and dissection system are disclosed. The system can include a mosquito staging subsystem; a robotic pick-and-place station; and a dissection, extrusion, collection, and disposal subsystem. The subsystems can include one or more stations to provide orientation, decapitation, extrusion of salivary glands, and disposal of carcasses of the mosquitoes. The resident live sporozoites from the salivary glands can be used to produce *Plasmodium* SPZ-based vaccines.

13 Claims, 27 Drawing Sheets

APPARATUS AND METHOD OF USE FOR AN AUTOMATED MOSQUITO SALIVARY GLAND EXTRACTION DEVICE

CROSS-REFERENCE TO RELATED APPLICATIONS AND INCORPORATION BY REFERENCE

The present application claims priority to U.S. Provisional Patent App. No. 62/888,160, and incorporates aspects and elements disclosed in U.S. patent application Ser. No. 15/621,875. These applications are incorporated herein by reference in their entireties for all purposes.

STATEMENT REGARDING FEDERALLY-SPONSORED RESEARCH AND DEVELOPMENT

This invention was made with government support under Grant No. 1R44AI134500 awarded by the National Institute of Health. The government has certain rights in the invention.

Additionally, the following articles are incorporated herein by reference in their entireties for all purposes: H. Phalen, P. Vagdargi, M. Pozin, S. Chakravarty, G. S. Chirikjian, I. Iordachita, and R. H. Taylor, "Mosquito Pick-and-Place: Automating a Key Step in PfSPZ-based Malaria Vaccine Production", in IEEE Conference on Automation Science and Engineering (CASE), Vancouver, BC, Aug. 22-26, 2019. pp. 12-17; [26] H. Wu, J. Mu, T. Da, M. Xu, R. H. Taylor, I. Iordachita, and G. S. Chirikjian, "Multi-mosquito object detection and 2D pose estimation for automation of PfSPZ malaria vaccine production", in IEEE 15th International Conference on Automation Science and Engineering (CASE), Vancouver, BC, Aug. 22-26, 2019. pp. 411-417; M. Xu, S. Lyu, Y. Xu, C. Kocabalkanli, B. K. Chirikjian, J. S. Chirikjian, J. Davis, J. S. Kim, I. Iordachita, R. H. Taylor, and G. S. Chirikjian, "Mosquito Staging Apparatus for producing PfSPZ Malaria Vaccines", in IEEE 15th International Conference on Automation Science and Engineering (CASE), Vancouver, BC, Aug. 22-26, 2019. pp. 443-449; H. Phalen, P. Vagdargi, M. L. Schrum, S. Chakravarty, A. Canezin, Michael Pozin, S. Coemert, I. Iordachita, S. L. Hoffman, G. S. Chirikjian, and R. H. Taylor, "A Mosquito Pick-and-Place System for PfSPZ-based Malaria Vaccine Production", IEEE Trans. Automation Science and Engineering, (to appear in special issue) Oct. 1, 2020. Can 20 Can 20. http://arxiv.org/abs/2004.05702 10.1109/TASE.2020.2992131; arXiv:2004.05702

FIELD

This invention relates generally to dissection of mosquitoes, to malaria, and to whole parasite vaccines.

BACKGROUND

Malaria presents a tremendous public health burden. In 2018, the 228 million cases of malaria were an increase of about 16 million cases over 2015. The number of deaths, 405,000, was not substantially different from 2015, however more people die every 10 days from malaria than the 11,310 who died during the 2013-2015 Ebola epidemic. Further, greater than 90% of cases and deaths from *Plasmodium falciparum* (PF), which itself causes more than 98% of all deaths from malaria, occur in sub-Saharan Africa. For 2017, the World Health Organization (WHO) estimates that 219 million individuals worldwide were infected with the disease in 2017 and ranked it among the top 20 leading causes of death among both adults and infants in 2016 [1, 2].

With increasing drug and insecticide resistance, it has become ever more difficult for current treatments to maintain efficacy in reducing the prevalence of malaria worldwide [3]. In addition the impact of traditional measures like vector control (bednets, residual insecticide spraying, larviciding), intermittent presumptive therapy, mass drug administration, and case management (diagnosis and treatment), on malaria has plateaued [25, 56] and new tools, especially a vaccine are needed.

The disease is estimated to cause almost $90B in GDP loss annually in Africa. Despite annual investments of over $3 billion for intensive control measures, 2017 was the third consecutive year in which there was no decrease. Moreover, WHO estimates deaths from malaria could double across sub-Saharan Africa this year due to disruptions in access to control measures, caused by the current COVID-19 pandemic. Only broad deployment of an effective vaccine holds the promise of true elimination or eradication, and more so in the face of sudden developments of competing priorities.

Development of malarial vaccines presents a promising way forward in the global effort for malaria eradication [3]. Progress has been made in the development of the Sanaria *Plasmodium falciparum* (Pf) sporozoite (SPZ) vaccine, Sanaria® PfSPZ Vaccine, an effective whole parasite vaccine manufactured from PfSPZ extracted from the salivary glands of female *Anopheles* mosquitoes [4-9]. This vaccine can reduce the burden of the disease by providing immunity against Pf, the most common malarial parasite, which was estimated to account for greater than 95% of deaths caused by malaria in 2017 [1, 10].

The major barrier to a successful malaria vaccine is the complexity of the pathogen, which undergoes multiple life cycle metamorphoses altering its antigenic composition and tissue compartments, avoiding detection by the immune system. The parasite circulates freely in the plasma following injection by mosquito bite, and then invades and develops inside hepatocytes, re-enters the blood stream housed in membrane-bound packets, invades erythrocytes, and periodically sequesters in micro vessels through endothelial adherence. Which among the greater than 5000 antigens expressed by these life stages might be optimal for targeting by a vaccine is unknown. Given this complexity, traditional approaches to vaccine development for viruses and bacteria do not apply to this parasite.

The process of whole parasite vaccine production presently requires manual salivary gland dissection from infected mosquitoes to isolate the mature sporozoites used to make the vaccine, and to date this has depended upon a training-intensive process of hand dissection. In addition, a device has been developed such that the user can simultaneously dissect a multiplicity of mosquitoes to increase that rate of production of sporozoites, as disclosed in U.S. Patent App. Pub. No. 2017/0355951 A1, incorporated herein by reference in its entirety. The lack of an automated device and process presents a major bottleneck in the scalability of this vaccine. In traditional manual methods, technicians are presented with a multiplicity of freshly-sacrificed, lab-grown mosquitoes and process them one at a time, removing the mosquito's head with a needle under microscope and squeezing out a volume of exudate that includes the PfSPZ-laden salivary glands (located in the rostral portion of the thorax). The exudate from mosquitoes is collected and processed for the isolation of PfSPZ.

The automation of salivary gland harvesting from in vivo mosquitoes has been attempted in the past [11-13]. However, a successful automated system has not yet been reported. As mentioned, a device and process to assist the user in mosquito micro-dissection has been developed and disclosed, referred to as a semi-automated mosquito micro-dissection system (hereinafter, "sAMMS") [14, 15]. This device and process is in part an embodiment of the dissection system described herein and in U.S. Patent App. Pub. No. 2017/0355951 A1. In the sAMMS process, described in the '951 publication, a technician uses micro-forceps to grab the mosquito proboscis 14 (FIG. 2), and sort mosquitoes into cartridges such that their necks 13 extend between cutter blades (FIGS. 18-19). Then, the blades are actuated to cut off all the heads, and a salivary gland extrusion apparatus 51 (e.g., a comb-like device) is used to extrude all the exudate, which is collected via a suction device. Early experience has shown that this device roughly doubles the throughput of purely manual dissection to an average of 470 mosquitoes per hour and reduces training time to reach peak operator performance from 39 to 1.5 weeks.

While a demonstrable improvement over manual methods, the sAMMS device and process was developed as a first step towards a more fully automated dissection system, which would enable large-scale production of enough vaccine for world-wide vaccination efforts.

BRIEF SUMMARY OF THE INVENTION

The devices described in this disclosure are automated mosquito dissection systems for extracting salivary glands from mosquitoes. In some embodiments, systems incorporate elements of the sAMMS device, or functional equivalents, as principal elements in the dissection system. These devices are a significant advancement over previously disclosed user assisting devices, and minimize the need for technicians while increasing the overall output of isolated mosquito salivary glands. Disclosed herein are devices configured for automating the extraction of salivary glands from a multiplicity of mosquitoes comprising: a) a mosquito staging subsystem; b) a robotic pick-and-place subsystem; and, c) a dissection, extrusion, collection, and disposal subsystem. In some embodiments, the mosquito staging subsystem may be replaced by a manual process in which a relatively unskilled human operator places mosquitoes onto a turntable or other staging apparatus.

Some embodiments are directed to a system for dissecting mosquitoes. The system may include a rotatable turntable having an outer edge, and a plurality of staging areas arranged radially on the rotatable turntable at the outer edge. Each staging area may an open area to receive a mosquito having a proboscis, a head, a neck, and a thorax. The system may include a computer vision system to detect at least one of a presence, a position, and an orientation of the mosquito within one of the plurality of staging areas on the turntable. The system may include a decapitation station having a means to decapitate the mosquito. The means may include at least one of blades, a laser, a fluid jet, and an air jet. In some embodiments, a decapitated mosquito may be considered as the mosquito without the proboscis and the head. In some embodiments, the system may include an extrusion/collection station to receive the decapitated mosquito and to extract and collect salivary glands from the thorax of the decapitated mosquito. The system may also include a cleaning/disposal station to collect the decapitated mosquito after the extrusion/collection station and to clean the one of the plurality of staging areas that received the mosquito.

In some embodiments, the system may provide that each staging area includes a stall having an open area to receive a mosquito. The open area of each of the stalls may narrow toward the outer edge of the rotatable turntable. The proboscis of the mosquito is positioned at an outer edge of one of the staging areas. In some embodiments, the rotatable turntable is configured to accept the mosquito from an operator manually placing the mosquito on the rotatable turntable. The rotatable turntable is rotatable to advance the mosquito through each station.

In some embodiments, the system includes a robotic pick-and-place apparatus having a gripper mechanism to transfer a mosquito from an open repository containing a plurality of mosquitos to a staging area. The system may include a head disposal apparatus configured to dispose the head and the proboscis of the decapitated mosquito—in some embodiments the robotic pick-and-place apparatus disposes of the head and proboscis of the mosquito. In some embodiments, the disposal apparatus includes at least one of a bin, a pool of liquid, a suction device, an air jet, a brush, and a fluid jet.

The cleaning/disposal station is configured to collect and remove decapitated mosquitoes. In some embodiments, the cleaning/disposal station includes at least one of a rotary cleaning brush, an air dispenser, a water dispenser, and a suction system.

In some embodiments, the robotic pick-and-place apparatus is configured to transfer the mosquito to the decapitation station. In some embodiments a separate robotic pick-and-place apparatus may be configured to transfer the mosquito to the decapitation station (i.e., there may be a plurality of robotic pick-and-place systems for different portions of the overall system. In some embodiments, the computer vision system includes at least one camera and is configured to detect one or more of the presence, position, and orientation of the head and proboscis of the mosquito. In some embodiments, the computer vision system includes at least one camera and is configured to detect each of the presence, position, and orientation of the head and proboscis of the mosquito.

The extrusion/collection station includes a means to compress the mosquito's thorax to extrude the salivary gland. In some embodiments, this means may include a finger to compress the thorax of the decapitated mosquito. In some embodiments, the extrusion/collection station may include at least one of a water jet, an air jet, and a suction device.

In some embodiments, the decapitation station includes a blade assembly having two slots between the blades, in some embodiments, each capable of receiving a neck of the mosquito. In some embodiments, the computer vision system is further configured to detect a position of at least one of the head and the neck of the mosquito when it is approaching or between the blades. The computer vision system may be configured to determine on which side the mosquito is lying.

Some embodiments are directed to a method of extracting salivary glands of a mosquito in a dissection system. The method may include, for example, detecting at least one of a presence and an orientation of a mosquito in first staging area on a transport mechanism by a computer vision system. The method may include locating the proboscis and head of the mosquito with a computer vision system, grasping the proboscis of the mosquitos, transferring the mosquito to second staging area located on a transport mechanism and positioned at a decapitation station such that a neck of the mosquito is disposed between two dissecting blades, actuating the two dissecting blades to decapitate the mosquito, wherein a decapitated mosquito is the mosquito without the proboscis and head attached to the proboscis, advancing the transport mechanism to expose the decapitated mosquito to an extraction/collection station for extracting and collecting the salivary glands of the decapitated mosquito, and advancing the transport mechanism to expose the second staging area to a cleaning/disposal station for removing the decapitated mosquito from the second staging area.

In some embodiments, the method may include manually placing the mosquito into a first staging area. Grasping of the mosquito and transferring of the mosquito may be effected by a robotic pick-and-place apparatus. In some embodiments, the transport mechanism is stationary when the robotic pick-and-place apparatus is transferring the mosquito to either the first or second staging area. The method may include placing the mosquito into either the first or second staging area such that the mosquito is oriented to be on its side. In some embodiments, the method may include placing the mosquito into the first staging area such that the proboscis of the mosquito points in a first direction towards an edge of a transport mechanism. The transport mechanism may include a plurality of second staging areas, and wherein advancing the transport mechanism provides that there is a second staging area with a decapitated mosquito present downstream of the decapitation station. The method may include disposing the decapitated mosquito in the cleaning/disposal station. In some embodiments, there may be a plurality of first staging areas on the transport mechanism. The first and second staging areas may be portions of "stalls" arranged around the periphery of the transport mechanism. The transport mechanism may include a turntable. The transport mechanism may be a turntable.

Some embodiments are directed to a system for extracting salivary glands from a mosquito. The system may include a turntable to transport a mosquito to different positions around the turntable. In some embodiments, the system may include a camera to detect at least one of a presence and an orientation of the mosquito, as well as the position and orientation of the mosquito's proboscis and head. The system may include a robot to grasp the mosquito and orient it for decapitation at a first position around the turntable. In some embodiments, the system may include one or more blades to decapitate the mosquito at the first position. An extrusion station may be provided to squeeze the mosquito and collect salivary glands of the mosquito at a second position around the turntable, the second position separate from the first position. The system may include a disposal station to dispose of the mosquito after its salivary glands are collected. In some embodiments, the turntable is configured to rotate to move from the first position to the second position.

BRIEF DESCRIPTION OF THE DRAWINGS/FIGURES

FIGS. 7A-B shows a dispensing apparatus using a pump to lift mosquitoes according to embodiments.

Figure 8:
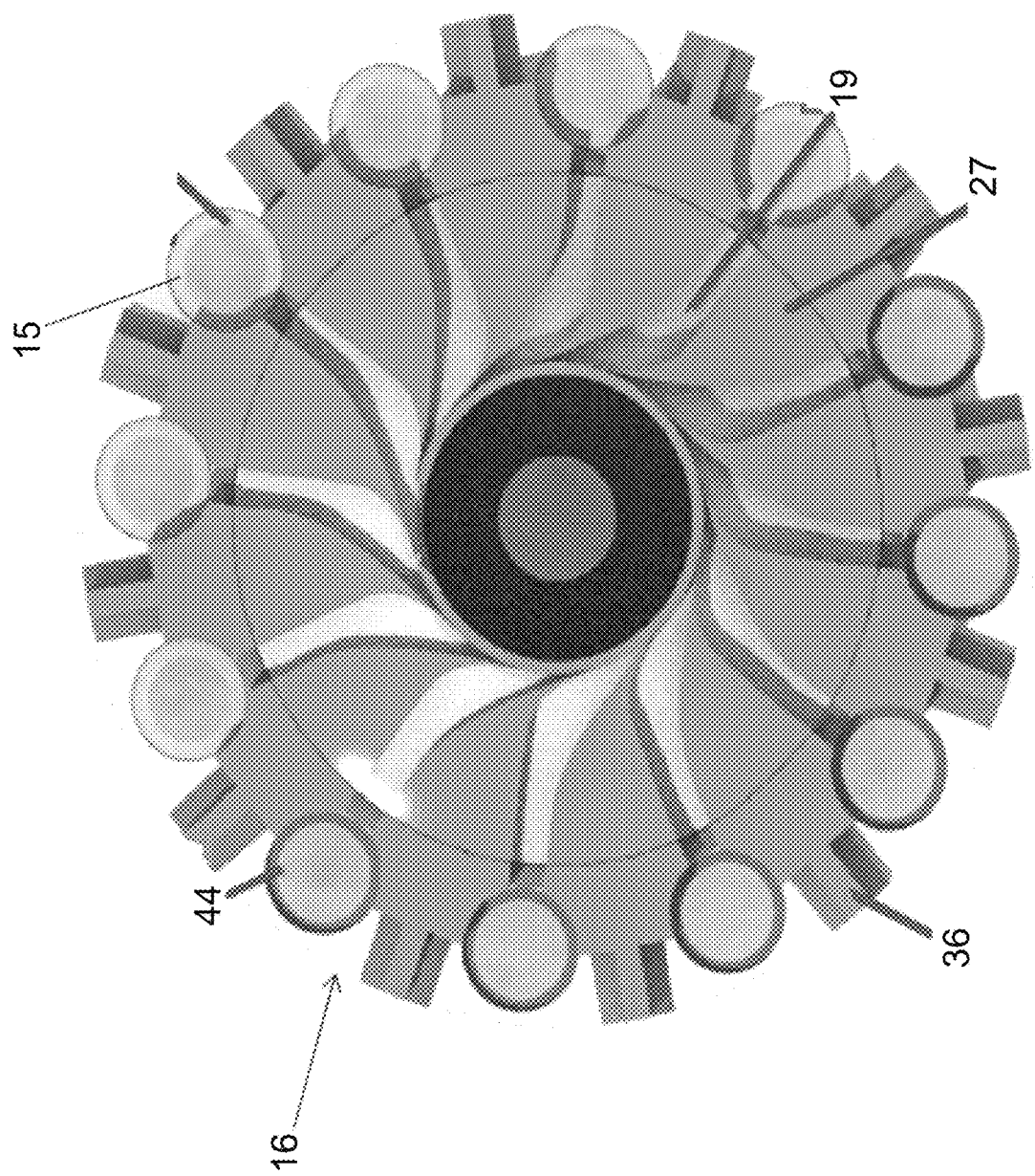

FIG. 8 shows a cone module with channels according to embodiments.

Figure 9A:
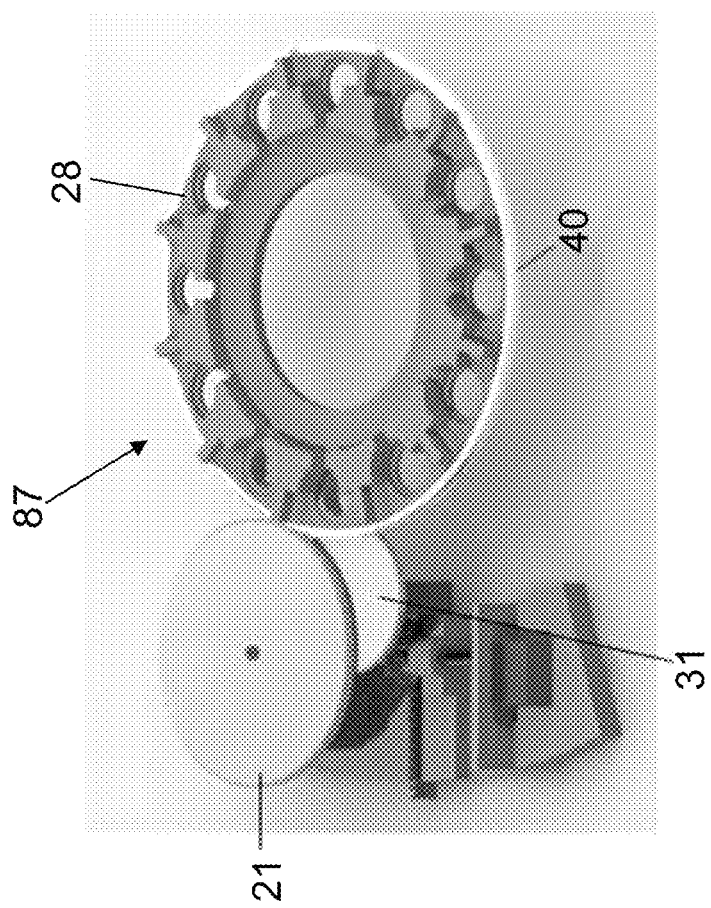
Figure 9B:
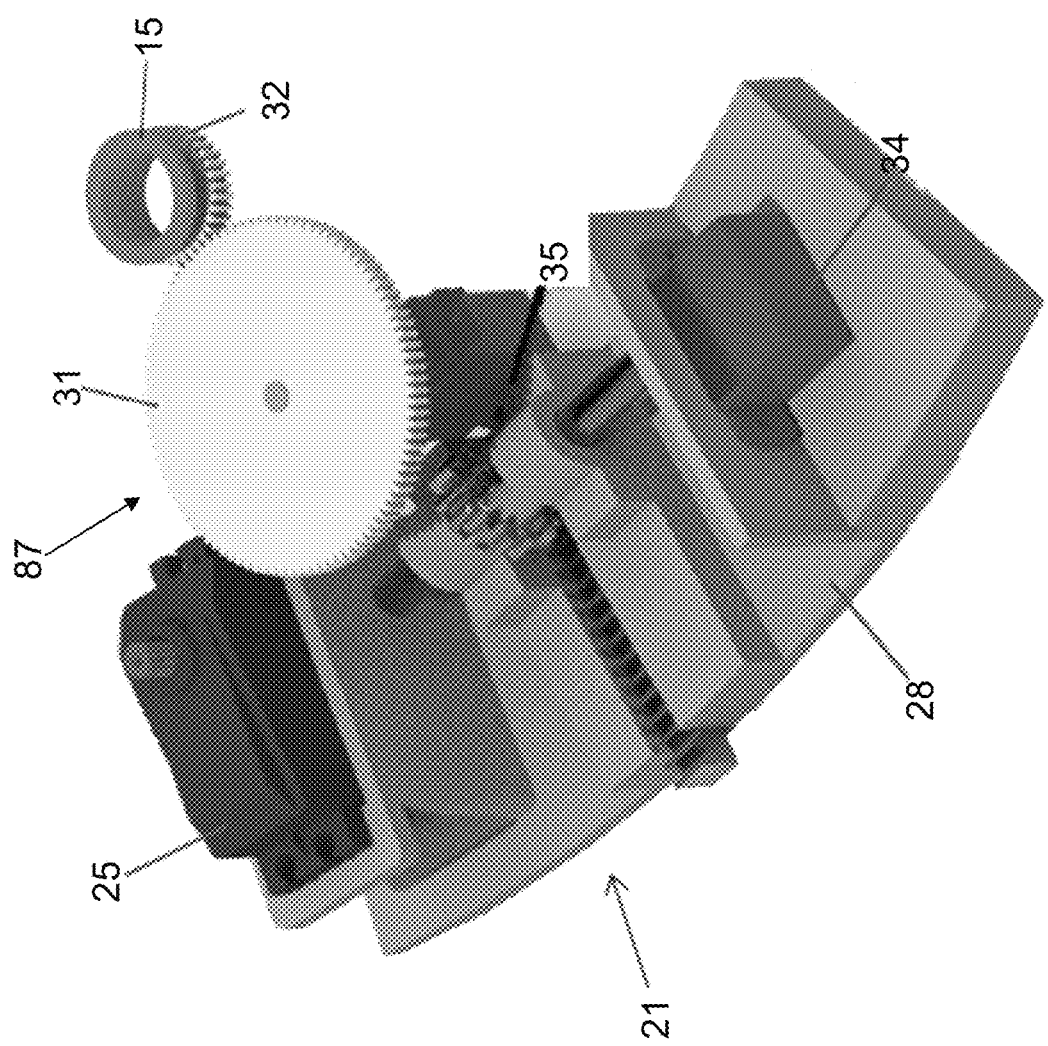

FIGS. 9A-B show a turntable rotation mechanism according to embodiments.

Figure 10:
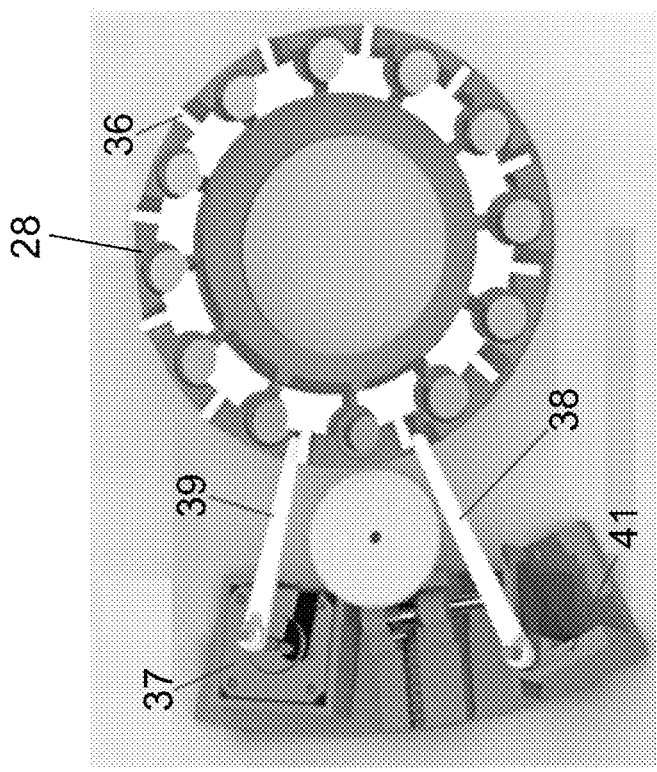

FIG. 10 shows a cup orientation mechanism according to embodiments.

Figure 11:
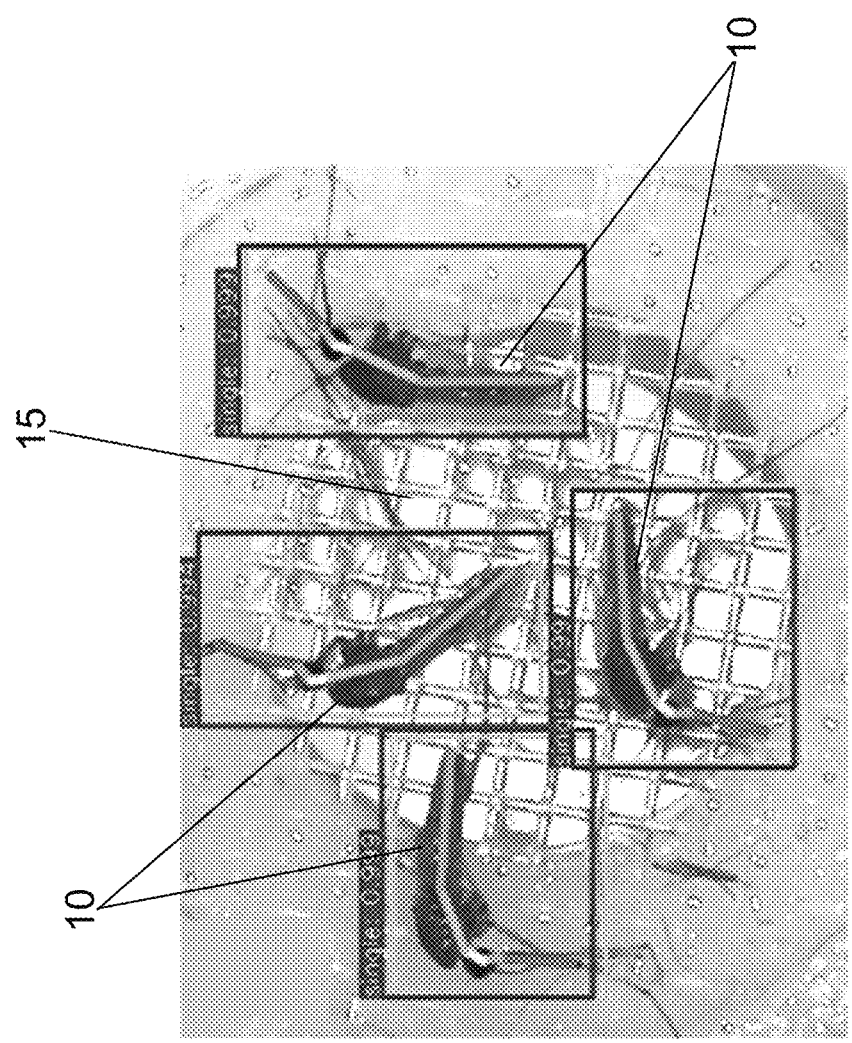

FIG. 11 shows a camera view of a computer vision system detection of mosquitoes according to embodiments.

Figure 12:
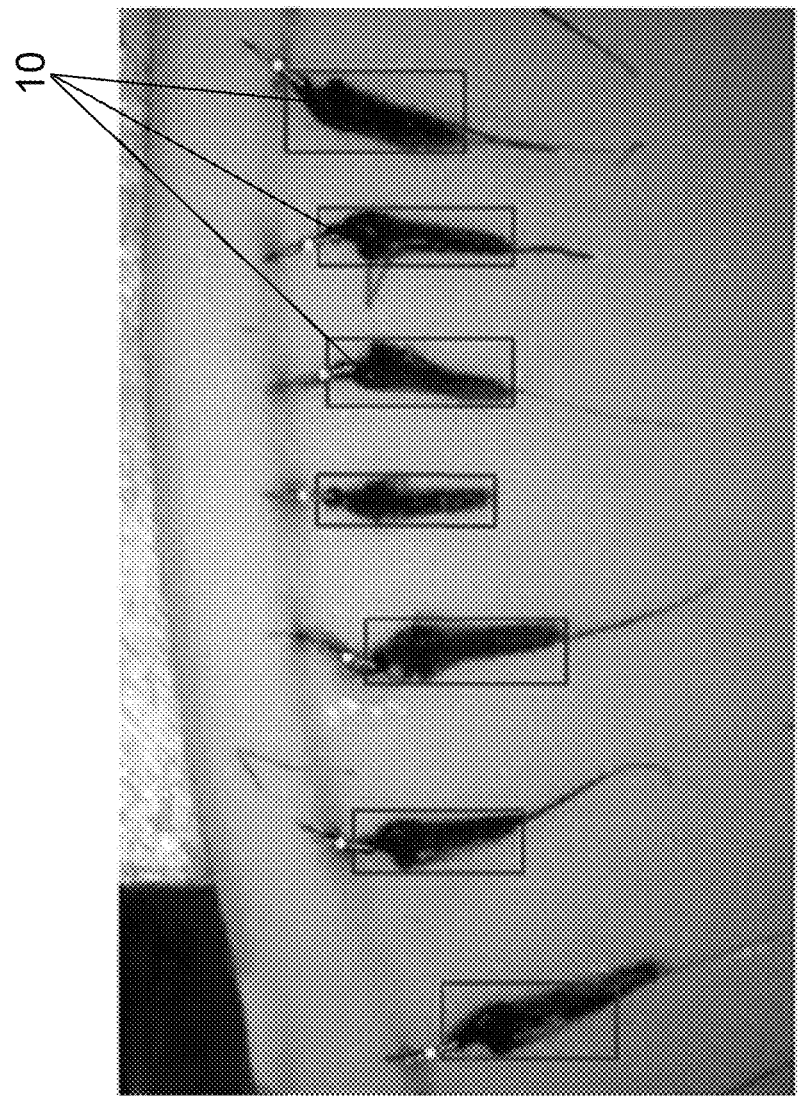

FIG. 12 shows a camera view of a computer vision system detection of mosquitoes according to embodiments.

Figure 13:
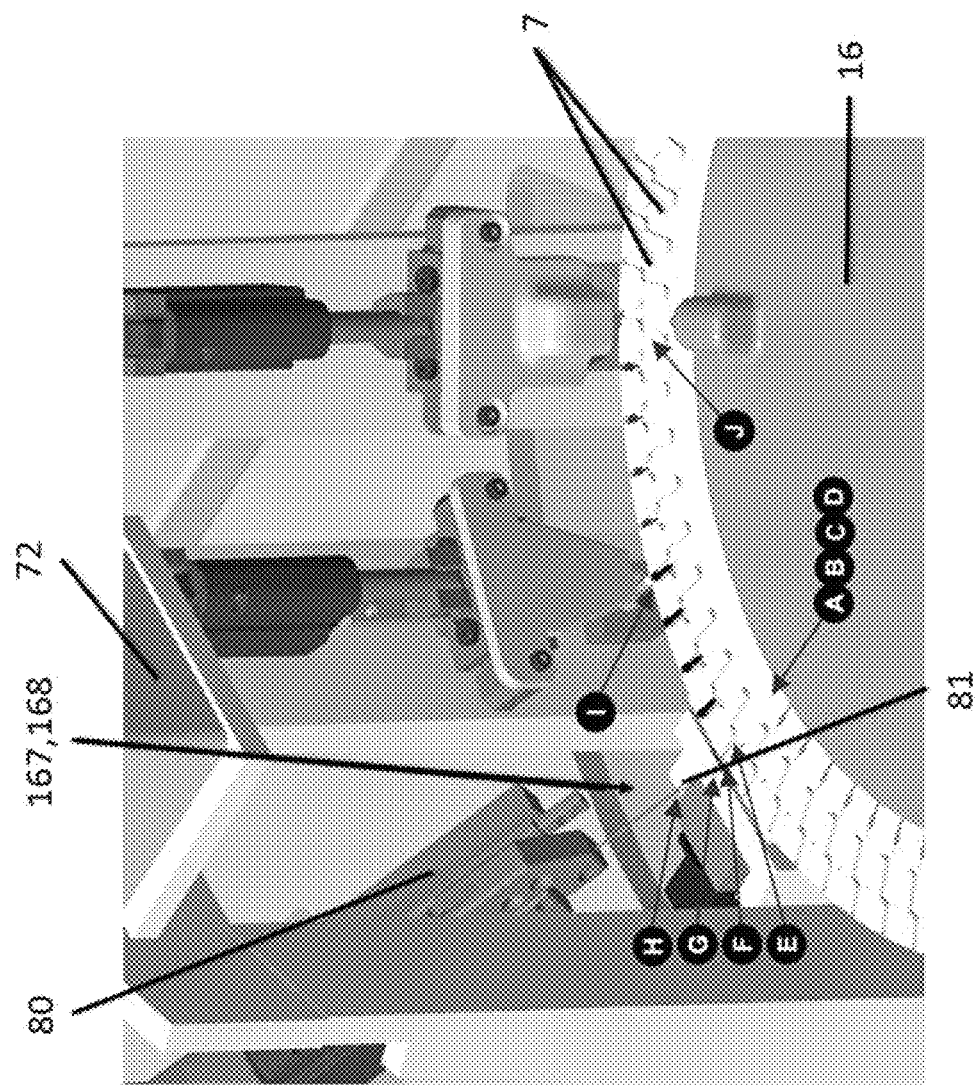

FIG. 13 shows computer vision system detection of mosquitoes according to embodiments.

Figure 14:
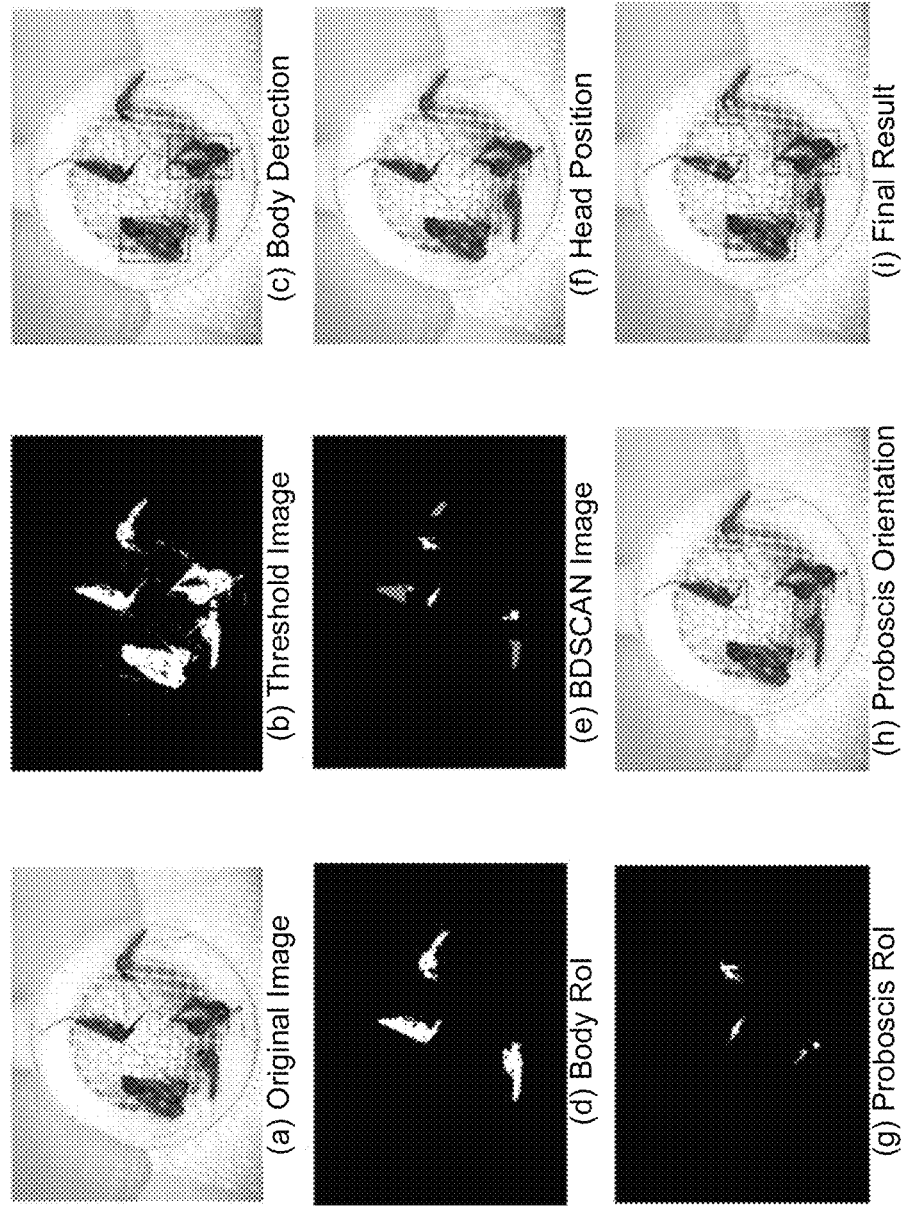

FIG. 14 shows camera views of a mosquito detection algorithm pipeline according to embodiments.

Figure 15:
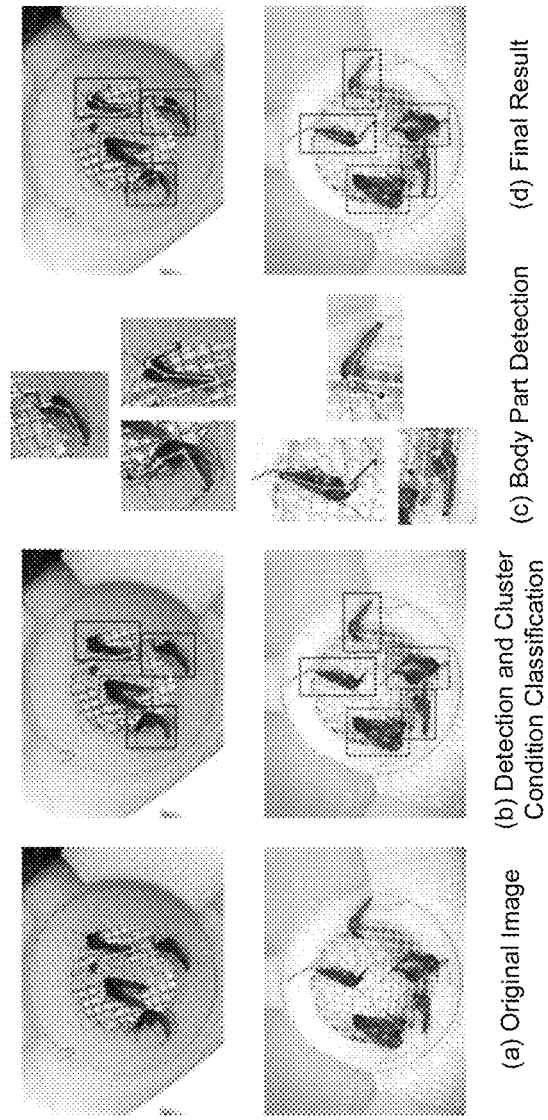

FIG. 15 shows a deep learning vision pipeline, and the original image (a) is firstly input into Mask R-CNN for cluster condition classification, shown in (b), non-clustered mosquitoes are labeled with blue boxes while clustered mosquitoes are labeled with red boxes, each non-clustered mosquito is then input into DeeperCut for body part detection, shown in (c), and (b) and (c) are assembled to generate the object detection and pose estimation for all mosquitoes, shown in (d), according to embodiments.

Figure 16:
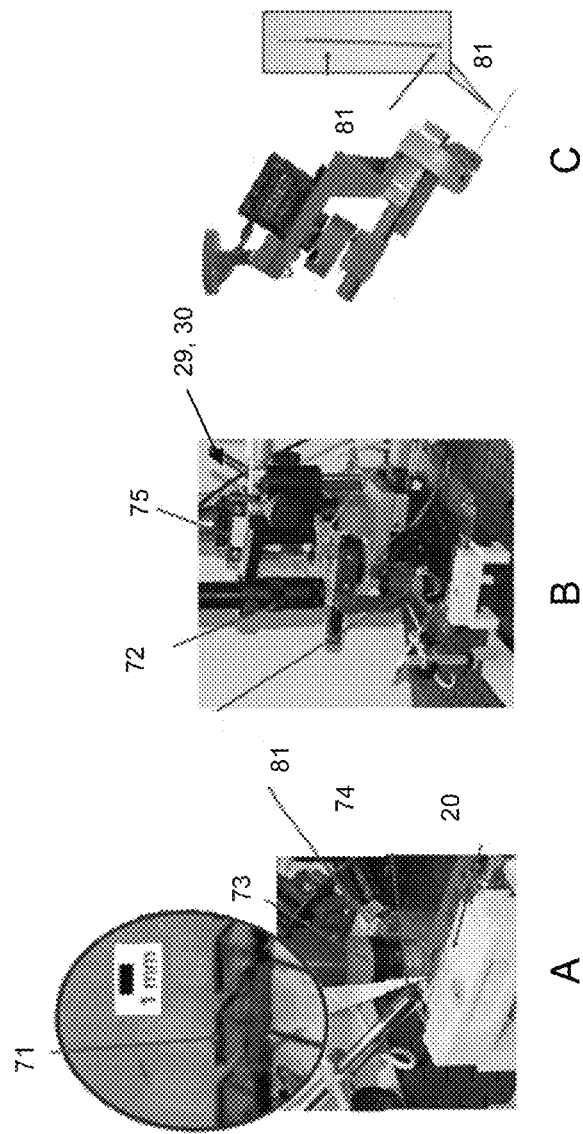

FIG. 16 depicts a decapitation subsystem with the robot, wherein (A) depicts robot and dissection blades; (B) shows robot with cameras; and (C) depicts design of gripper end-effector according to embodiments.

Figure 17:
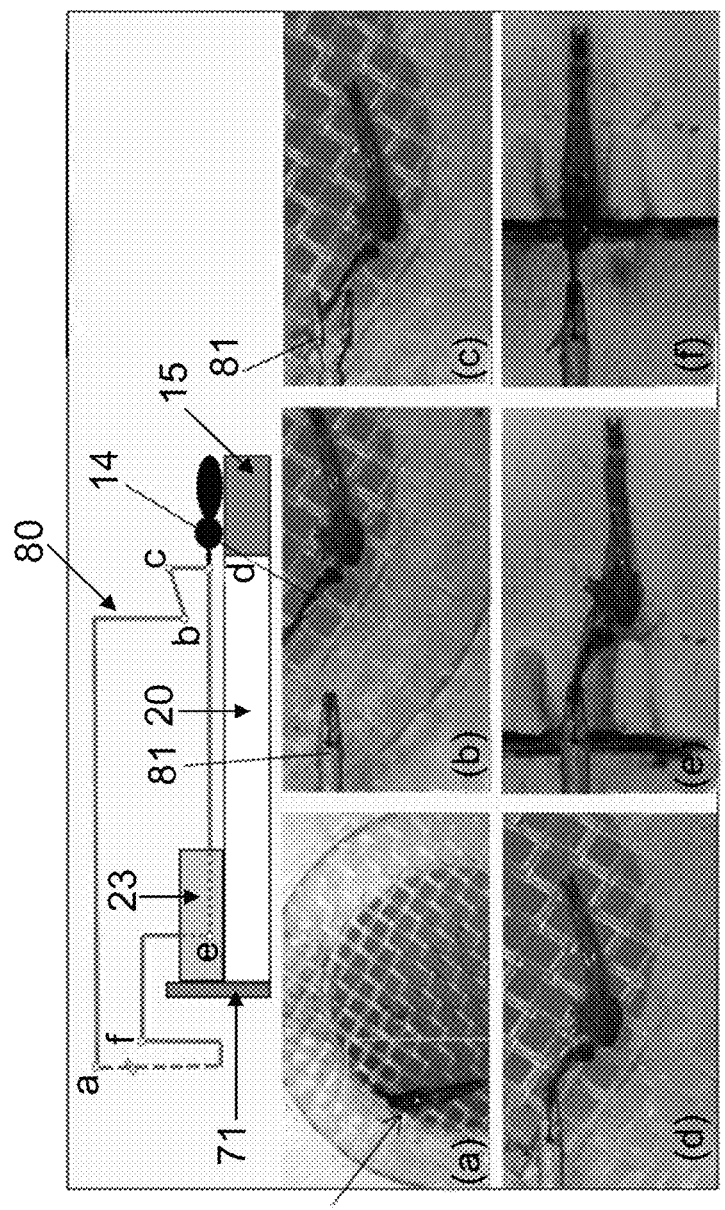

FIG. 17 shows stages of a robot transporting mosquito to a cartridge according to embodiments.

Figure 18:
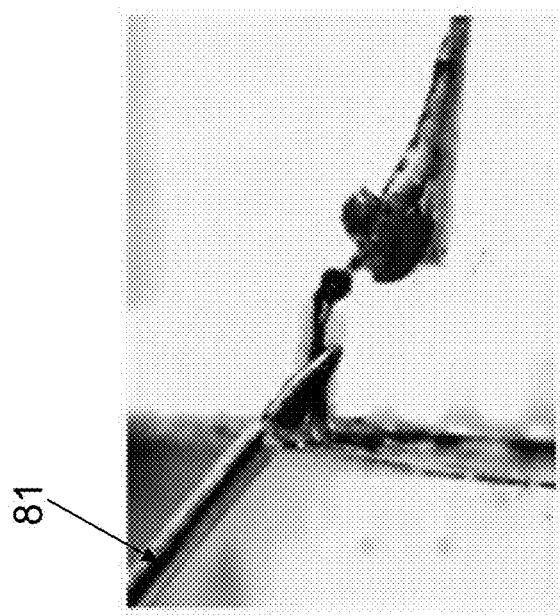

FIG. 18 shows a gripper mechanism according to embodiments.

Figure 19:
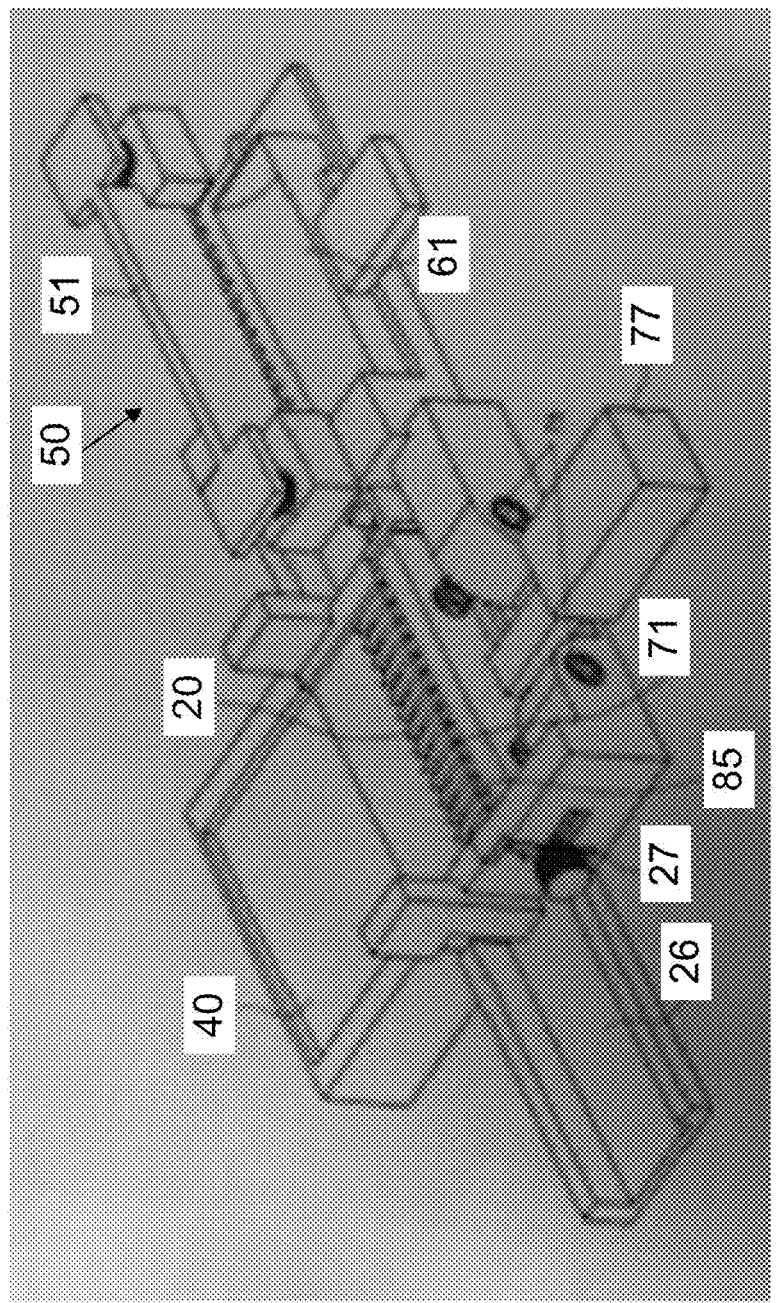

FIG. 19 depicts the sAMMS of the user assisted dissection device as disclosed in U.S. Patent App. Pub. No. 2017/0355951 A1, essential features of which have been incorporated into the dissection subsystem, according to embodiments.

Figure 20:
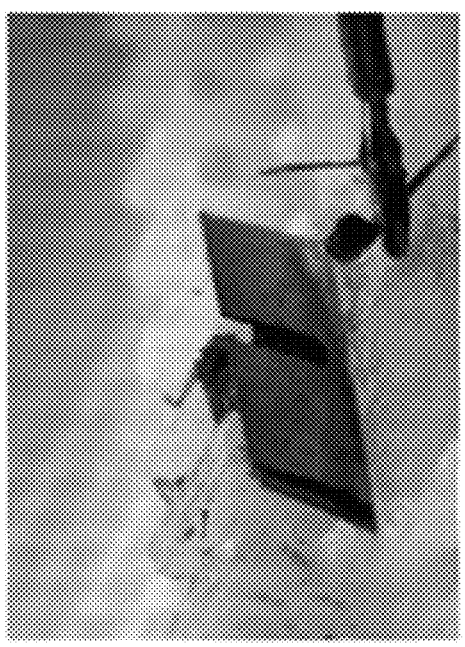

FIG. 20 shows a decapitation apparatus having blades according to embodiments.

Figure 21:
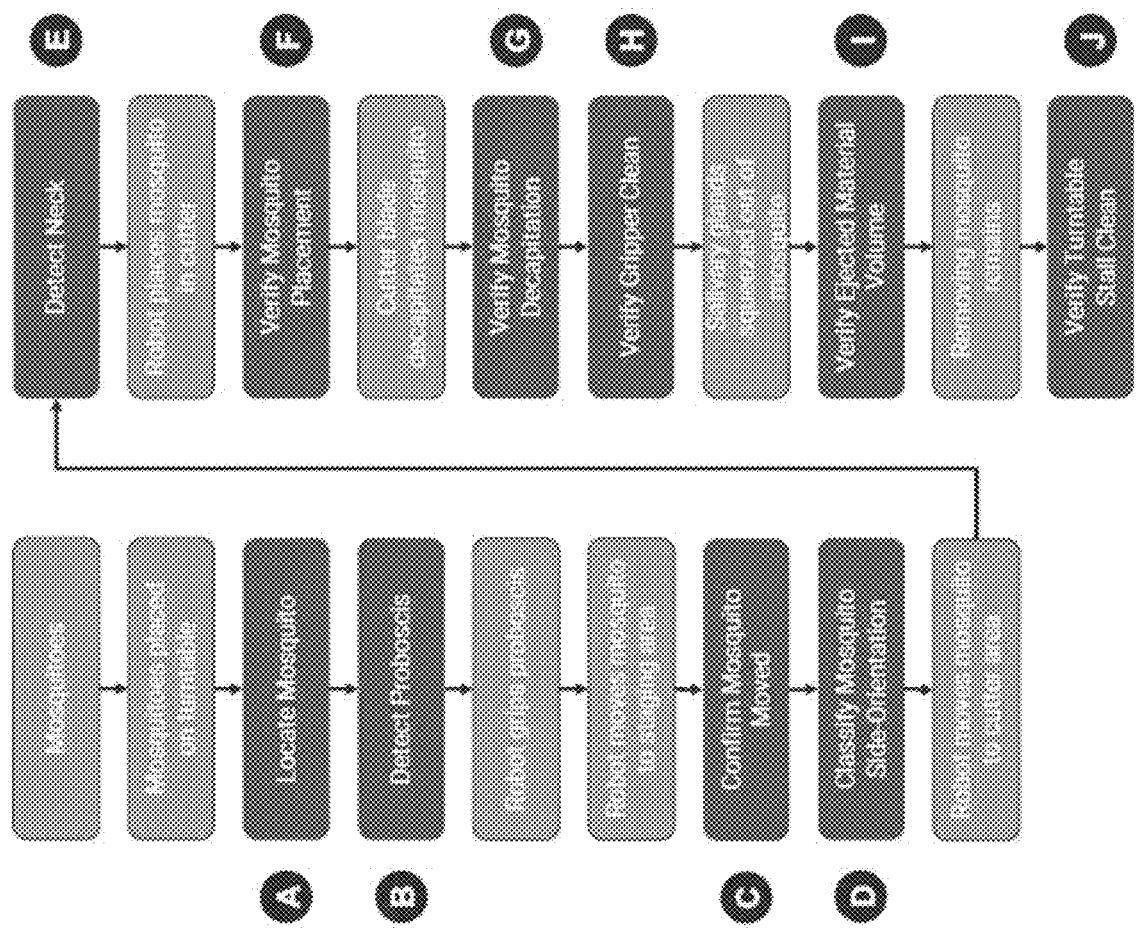

FIG. 21 shows a flowchart of a combined mosquito staging and dissection system according to embodiments.

Figure 22:
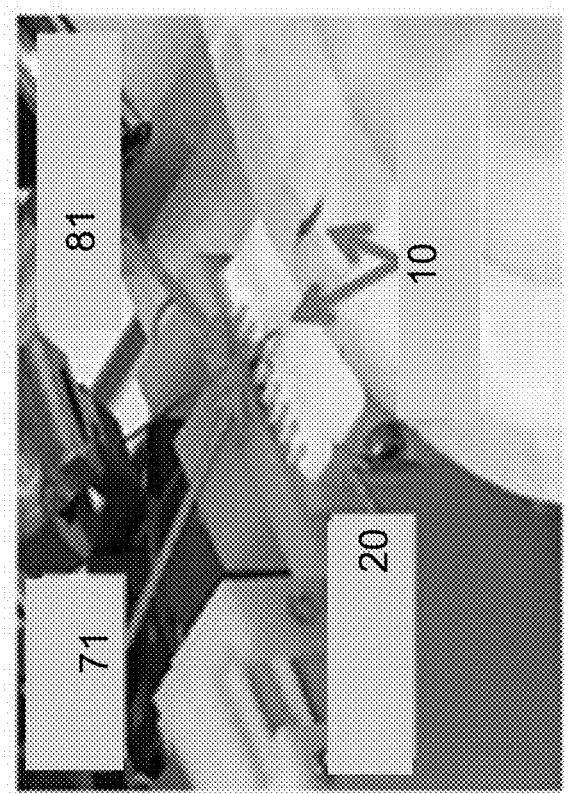

FIG. 22 shows the decapitation and extrusion/collection components of the dissection subsystem according to embodiments.

Figure 23:
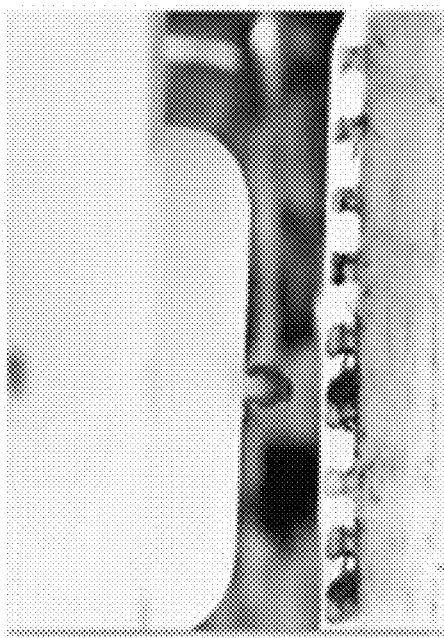

FIG. 23 shows a salivary gland extrusion apparatus according to embodiments.

Figure 24:
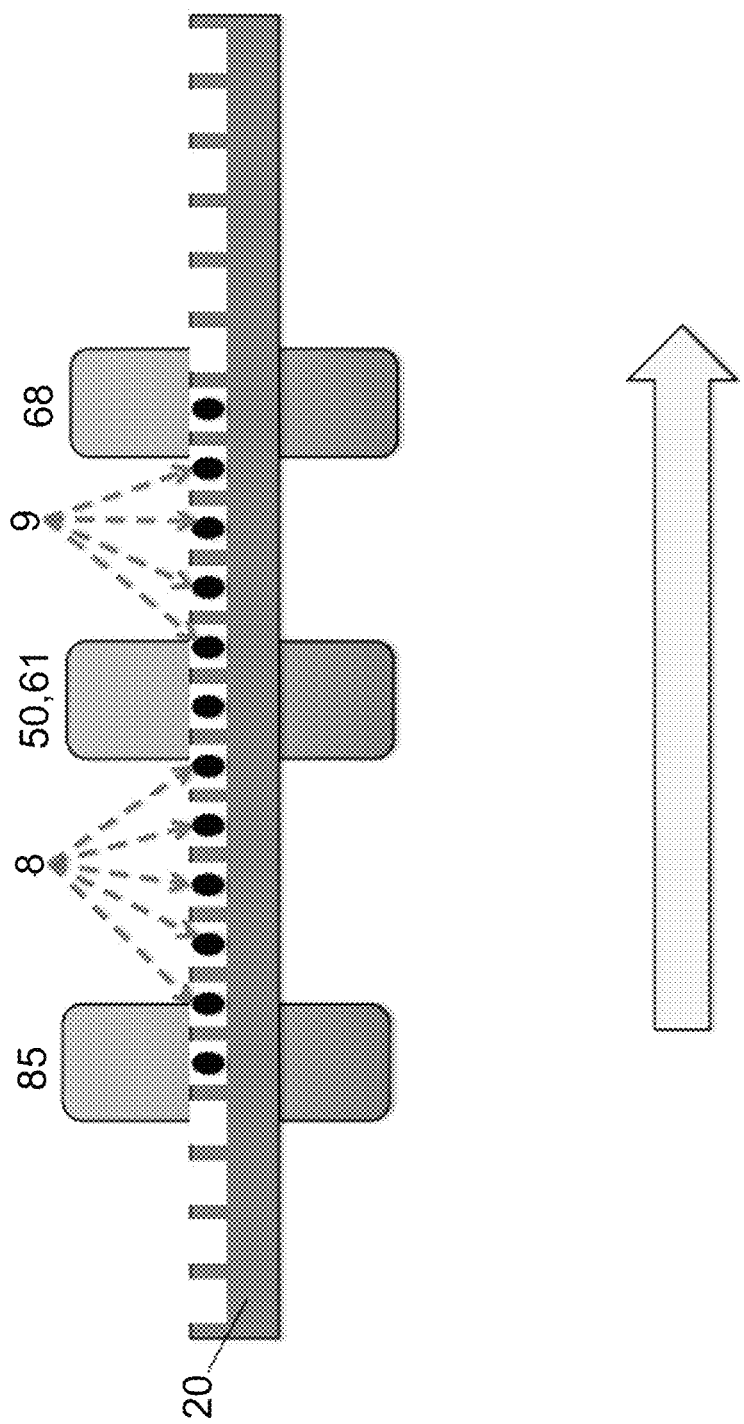

FIG. 24 shows stages of a transport mechanism and a cartridge transporting decapitated mosquitoes between stations of the dissection subsystem according to embodiments.

Figure 25:
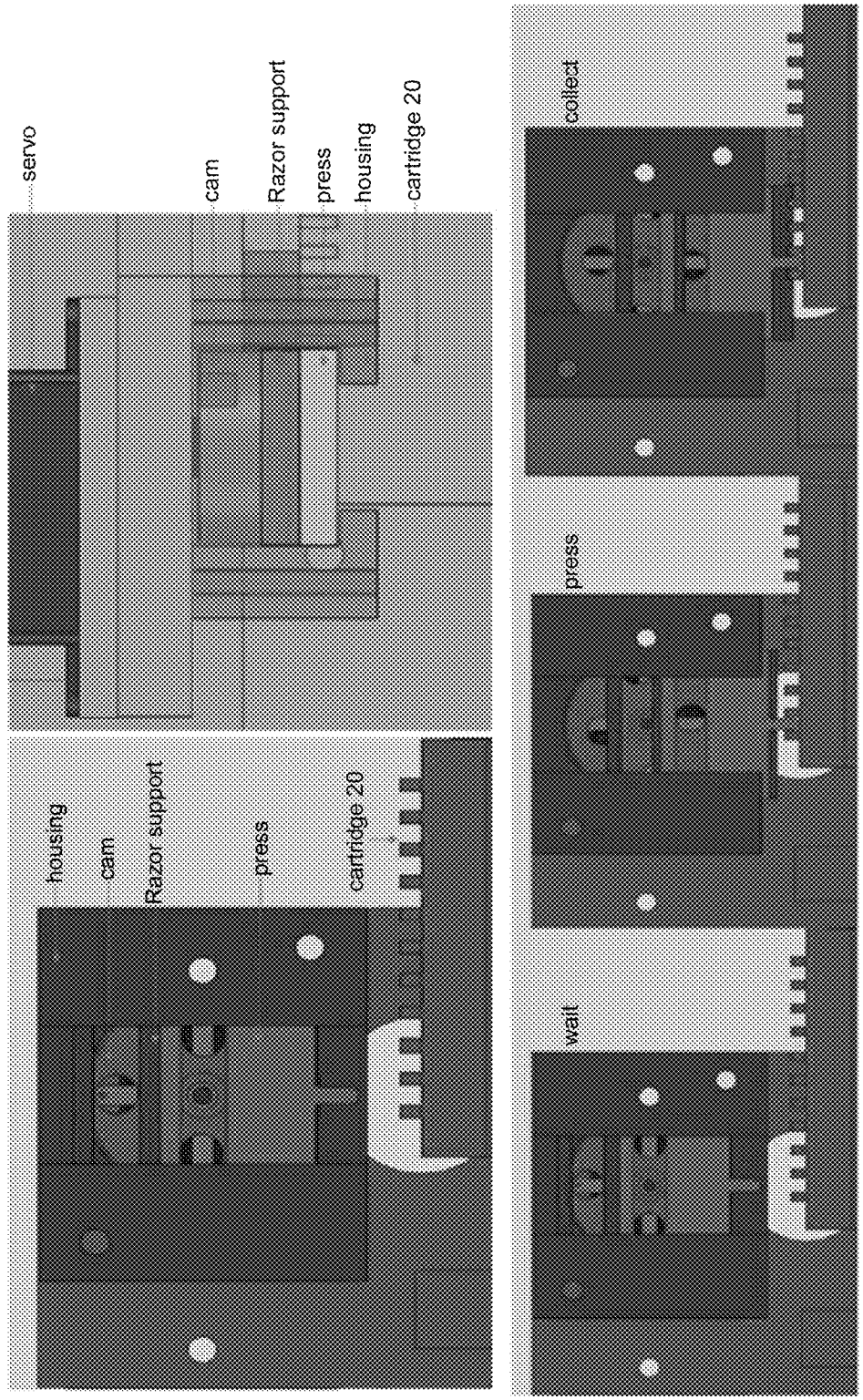

FIG. 25 shows the function of the extrusion station of the dissection subsystem according to embodiments.

Figure 26:
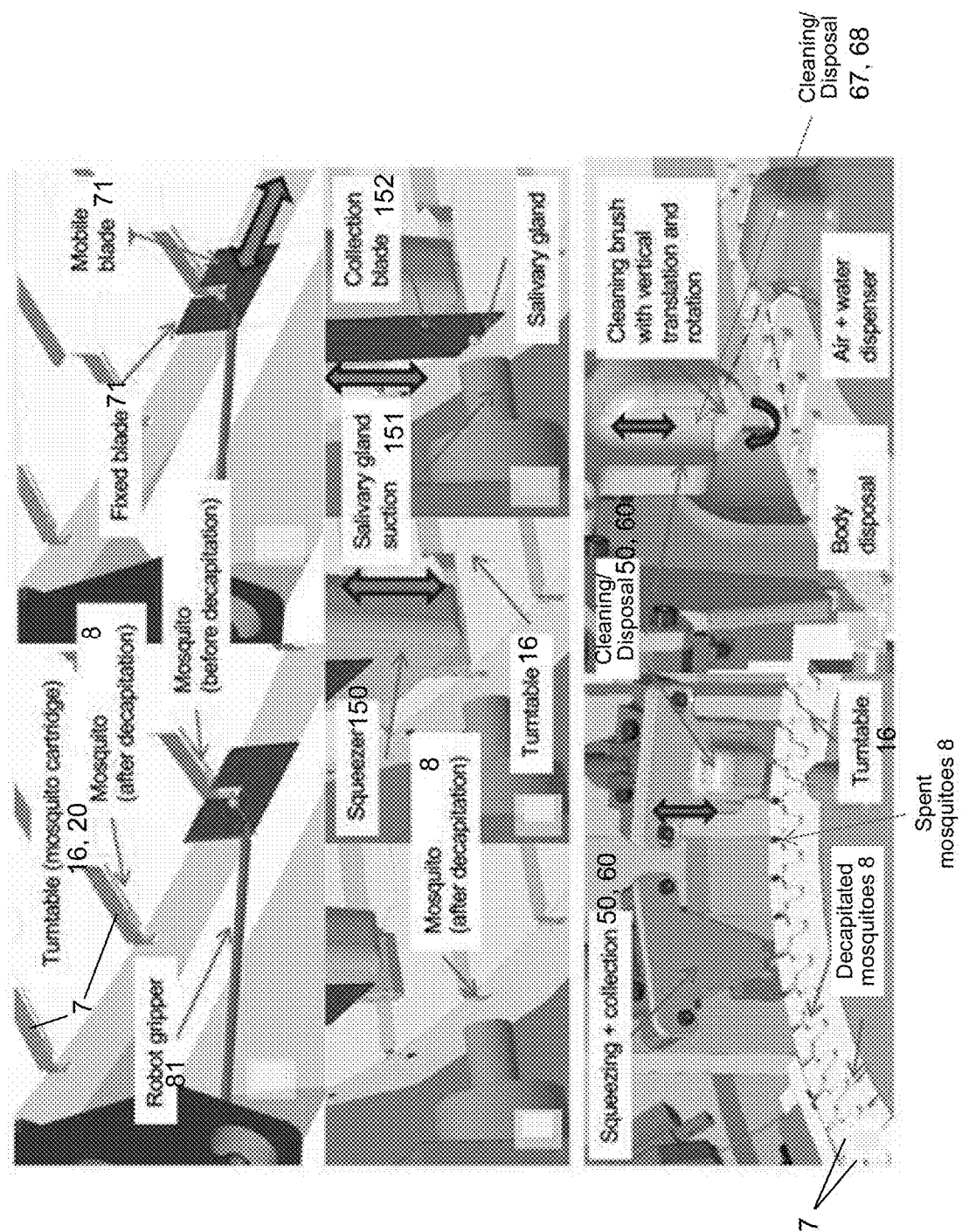

FIG. 26 shows components of a combined mosquito staging and dissection system according to embodiments.

DETAILED DESCRIPTION OF THE INVENTION

Figure 1:
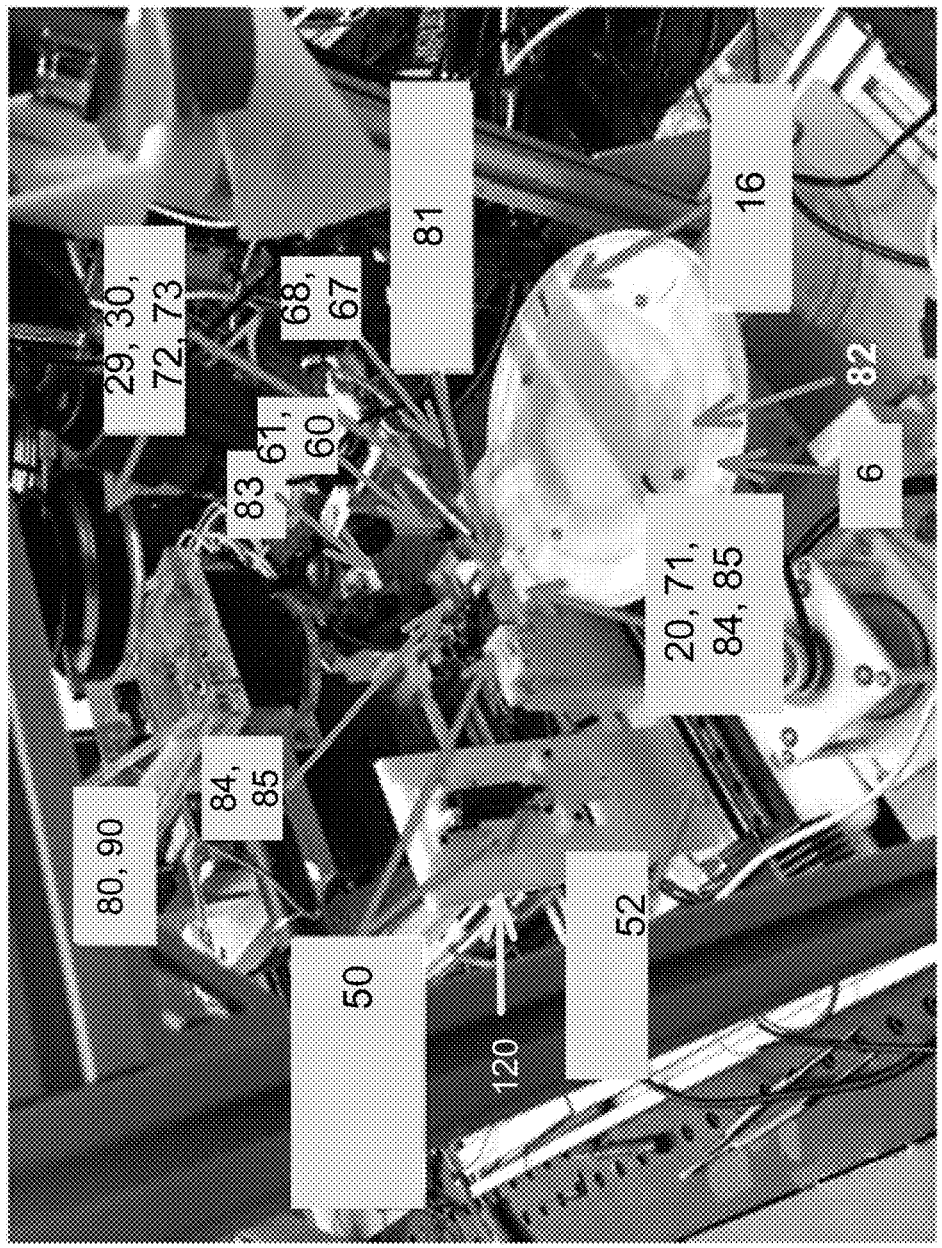
FIG. 1 shows a combined mosquito staging and dissection system according to embodiments.

FIG. 1 shows a combined mosquito staging and dissection system according to embodiments. The major components and overall workflow of this system can include a mosquito staging subsystem 82; a robotic pick-and-place subsystem 88; and a dissection subsystem 83. The subsystems can include one more stations or subsystems. For example, the robotic pick-and-place subsystem is typically packaged into a robotic pick-and-place station 90 comprising robotic-pick-and place apparatus 80 and a head disposal sub-station 168 comprising head disposal apparatus 167. The dissection subsystem 83 comprises: decapitation apparatus 84; a decapitation station 85 with decapitation apparatus 84; a combined gland extrusion/collection station (50, 61) comprising extrusion apparatus 51 and collection apparatus 60; and a cleaning/disposal station 68 comprising cleaning/disposal apparatus 67. It may also comprise a transport mechanism 52 and cartridge 20 or its components may be distributed about a turn-table 16 (as shown in the embodiment in FIG. 3). One or more stations can include a computer vision system 29 and computer vision apparatus 30. Each, some, or all of these features can also be used independent of the mosquito dissection system. The decapitation station 85 may comprise blades 71 for decapitating the mosquito's neck. In an alternative embodiments, decapitation may be done by a laser, water jet, or air jet.

In some embodiments, one or more operators can manually place a multiplicity of freshly killed mosquitoes around a rotatable turntable 16 (e.g., a turntable module or a turntable ring for orientation or reorientation) in the mosquito staging subsystem 82. The turntable may be configured as a staging area, or have a plurality of staging areas arranged radially along the outer edge, as shown. A robotic pick-and-place apparatus 80 can retrieve the mosquitoes and transfer them to the dissection subsystem 83 and dispose of the mosquito's head after decapitation. The dissection subsystem 83 can then decapitate the mosquitoes, extrude salivary glands containing sporozoites from the mosquitoes. The cleaning/disposal apparatus 67 can be used to remove spent mosquito carcasses 9 for disposal. In some embodiments, the steps in the dissection subsystem 83 can be performed concurrently with each other and with actions by the pick-and-place robot.

Figure 2:
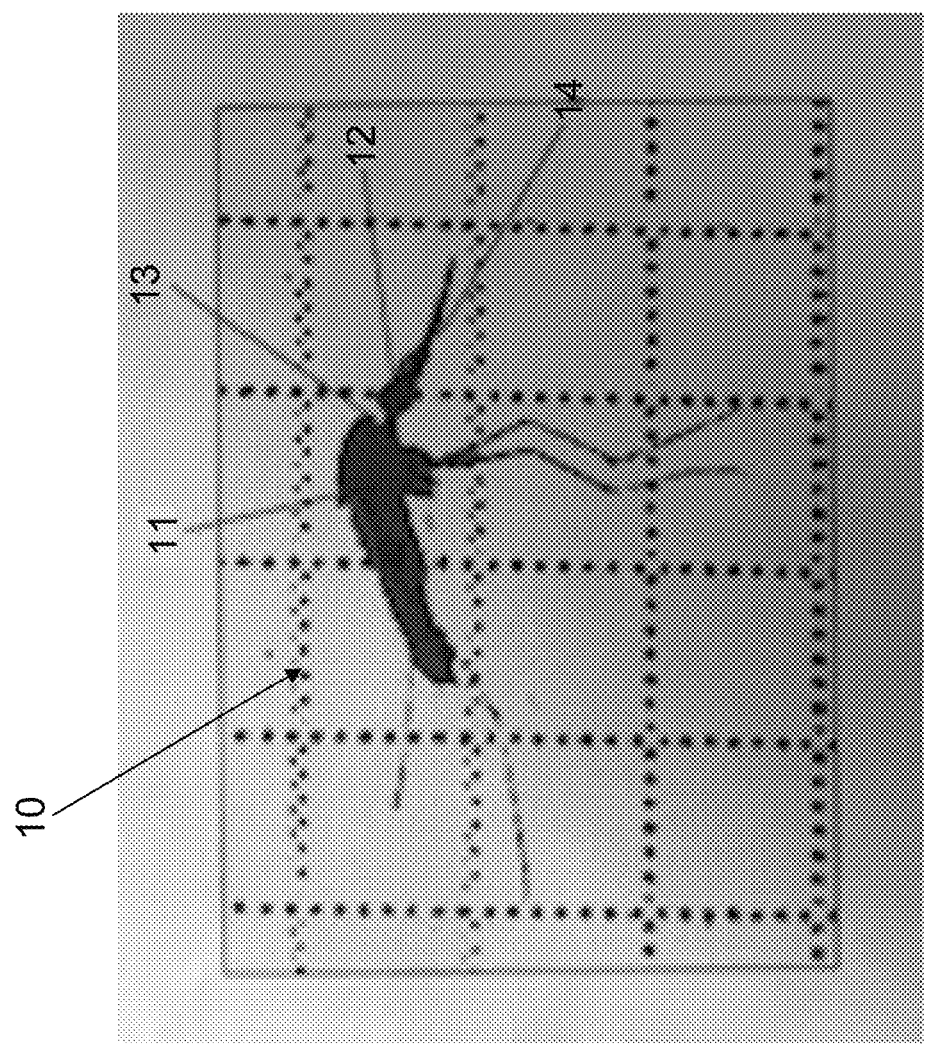
FIG. 2 shows the relevant components of mosquito anatomy according to embodiments.

In some embodiments, manual grasping of a mosquito's proboscis 14 (FIG. 2) can be easily performed by a relatively unskilled human operator avoiding the need for the mosquito's neck 13 to be in a particular position for decapitation. Tweezers can be used to grasp individual mosquitoes by the proboscis 14 and arrange them on the turntable 16. The oriented mosquitoes 10 can be arranged such that the proboscis 14 is directed radially outward from the center of turntable 16.

Figure 3:
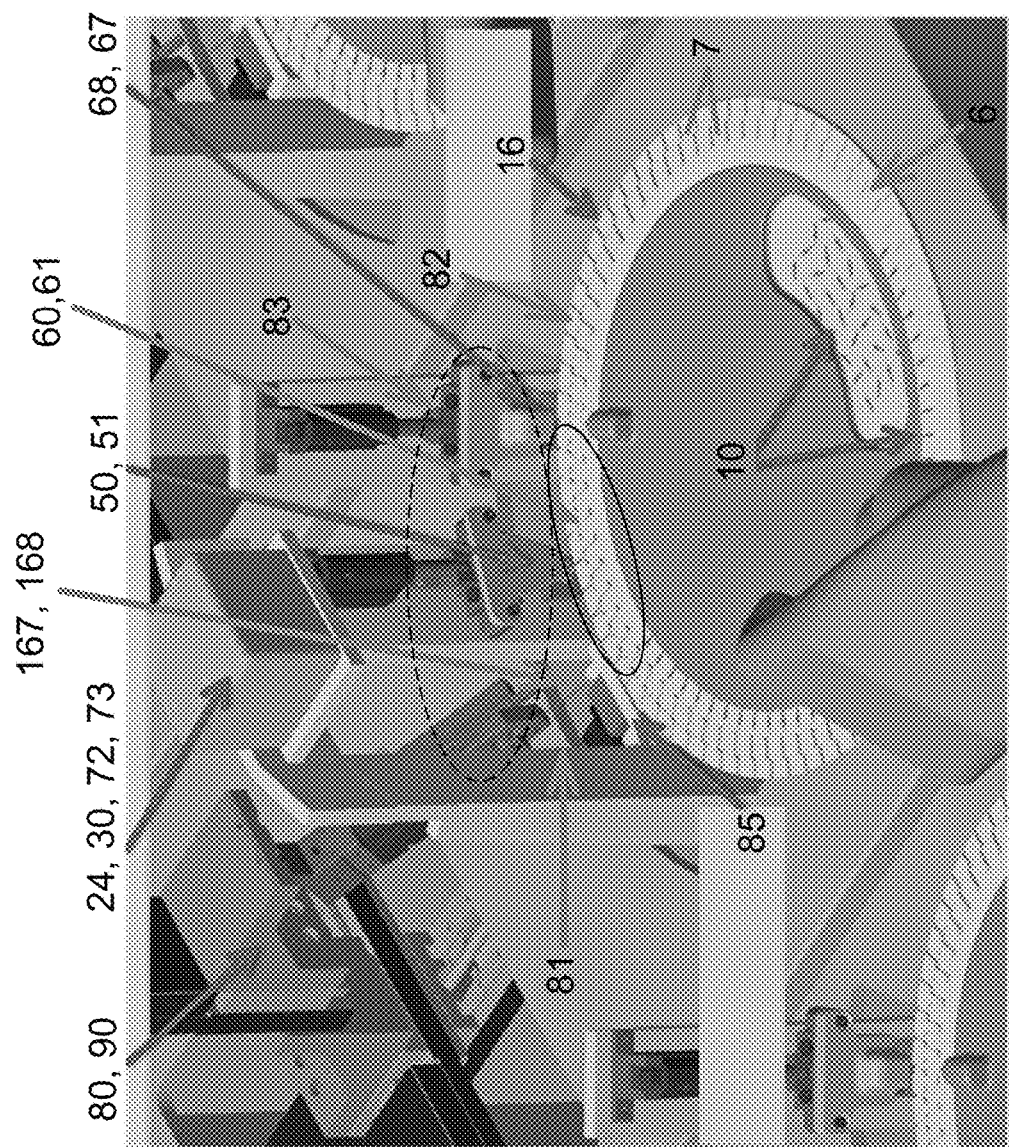
FIG. 3 shows a combined mosquito staging and dissection system according to embodiments.

With reference to FIG. 3, the operator can manually arrange the mosquitoes into a plurality of individual staging areas or staging compartments, such as stalls 7, arranged around the outer edge of the turntable 16 (e.g., on a transport ring). The outer edge containing the stalls 7 can rotate with the turntable 16 and/or relative to the turntable 16. In some embodiments, the turntable 16 can have an outer diameter of approximately 220-260 mm with mosquito stalls 7 positioned approximately every five degrees. However, other turntable diameters and angular separations of the stalls may be chosen to facilitate throughput and to facilitate the arrangement of apparatus around the periphery of the turntable, to facilitate access of the operator to the system, or to permit multiple operators and automated components to be placed at a single workstation with common ventilation. Each stall 7 can have a relatively large open area for the operator to place the mosquito in an approximate desired orientation. The orientation and position of the mosquito need only be sufficient to enable the robotic pick-and-place apparatus 80 to grasp the proboscis 14 of the mosquito. The stalls 7 can narrow around the outer edge to constrain the body of the mosquitoes 10 to facilitate extrusion and gland extraction. Once the mosquitoes 10 are placed in the stalls 7, the robotic pick-and-place apparatus 80 can lift and transfer them to the dissection subsystem 83. During transfer, it is advantageous to drag the mosquito along a stall 7 or over the bottom of a cartridge 20 so that the wings and legs of the mosquito fold down against the body, in order to facilitate placing the neck 13 between the decapitation blades 71. It is also advantageous if there is a small amount of fluid present, in order to facilitate the folding process.

In some embodiments, the stations of the dissection subsystem 83 can be positioned along the turntable 16. As the turntable 16 is rotated, the mosquitoes 10 can advance through each station. In some embodiments, the turntable 16 can have a central part supporting a removable mosquito pool container. A single operator can easily work between multiple combined mosquito staging and dissection systems.

Figure 4:
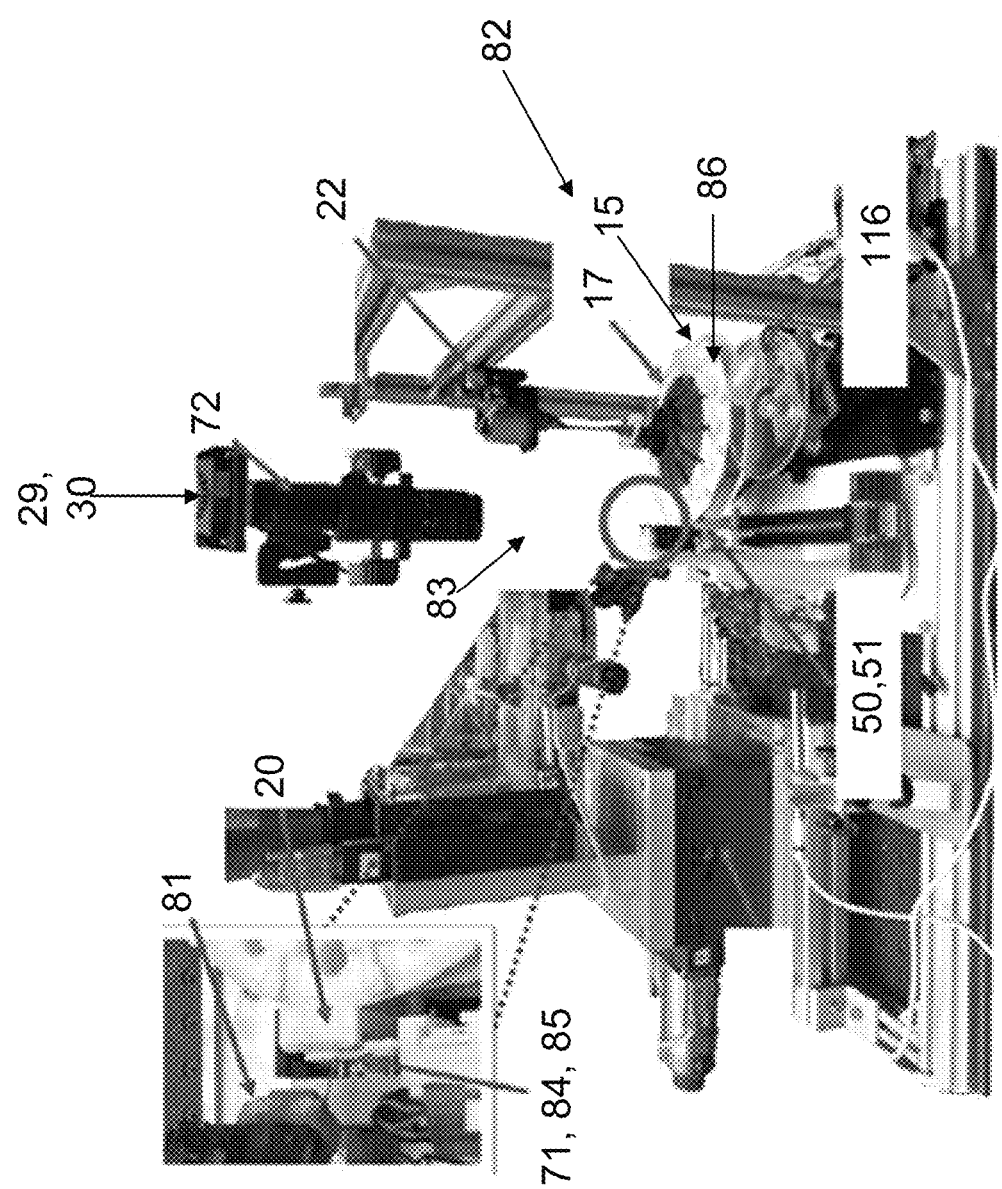
FIG. 4 shows an automated combined mosquito staging and dissection system according to embodiments.

With reference to FIG. 4, in other embodiments, the mosquito staging subsystem 82 can accept a multiplicity of freshly killed mosquitoes semi-automatically or automatically and automatically distribute individual mosquitoes into staging areas. The individual mosquitoes 10 can be distributed in a convenient orientation to enable a robotic pick-and-place apparatus 80 to transfer the oriented mosquitoes 10 to the dissection subsystem 83. In the embodiment shown the mosquito staging areas comprise cups 15 that can be rotated to place the mosquitoes 10 into convenient orientations for the robotic pick-and-place apparatus 80 to grasp the mosquitoes. The cups 15 may comprise a mesh or porous material on the bottom to permit fluid to drain out, leaving the mosquito behind.

Figure 5:
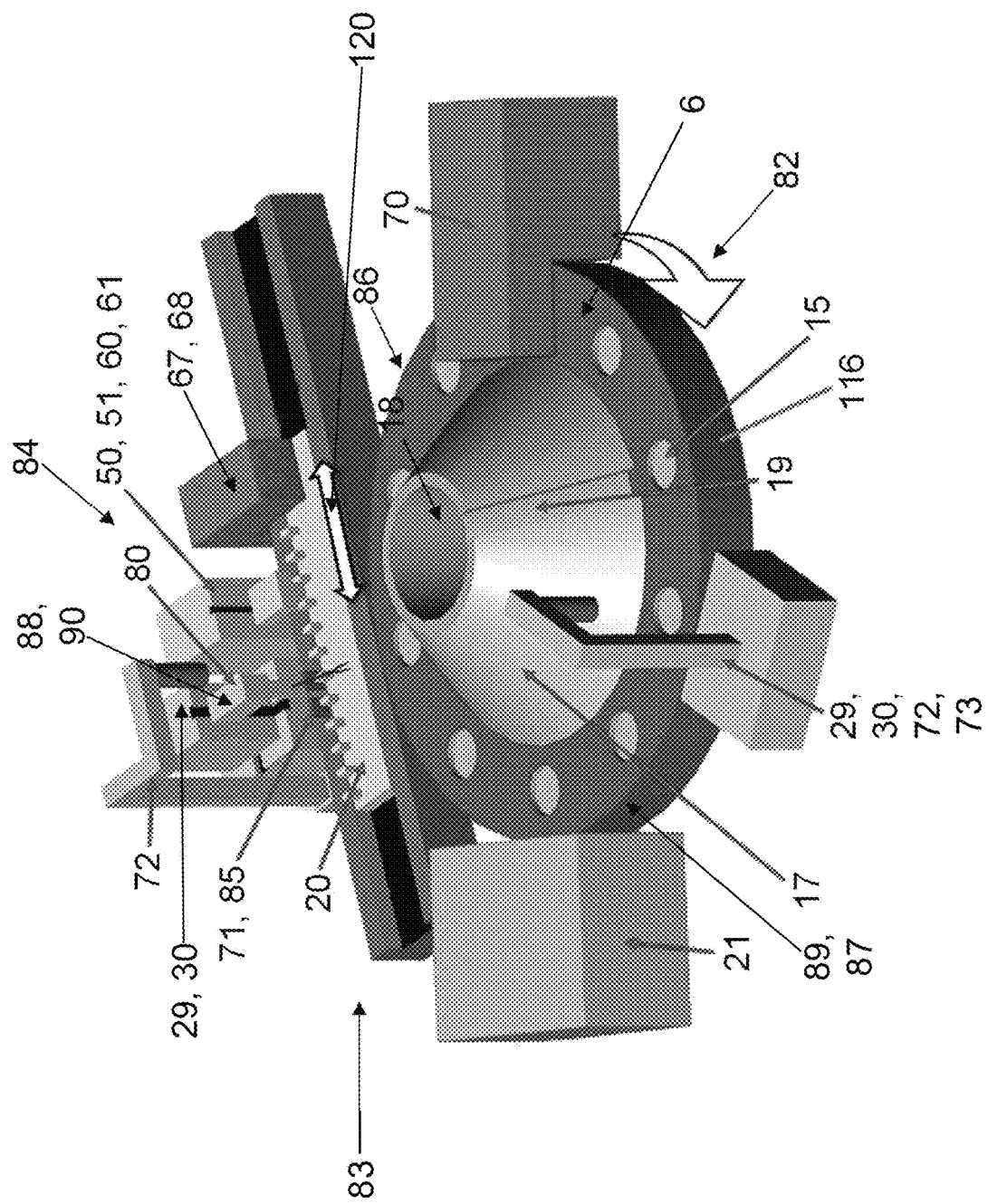
FIG. 5 shows a schematic view of an automated combined mosquito staging and dissection system according to embodiments, with channels (shown in FIG. 8) removed for visual clarity.

With reference to FIG. 5, in some embodiments, the mosquito staging subsystem 82 can additionally include a dispensing apparatus 86, comprising carousel 116 with cups 15, an orientation station 89, an orientation apparatus 87, and a carousel/cup cleaning station 70. Each, some, or all of these features can also be used independent of the fully automated mosquito dissection system as part of an operator-assisted device.

Figure 6:
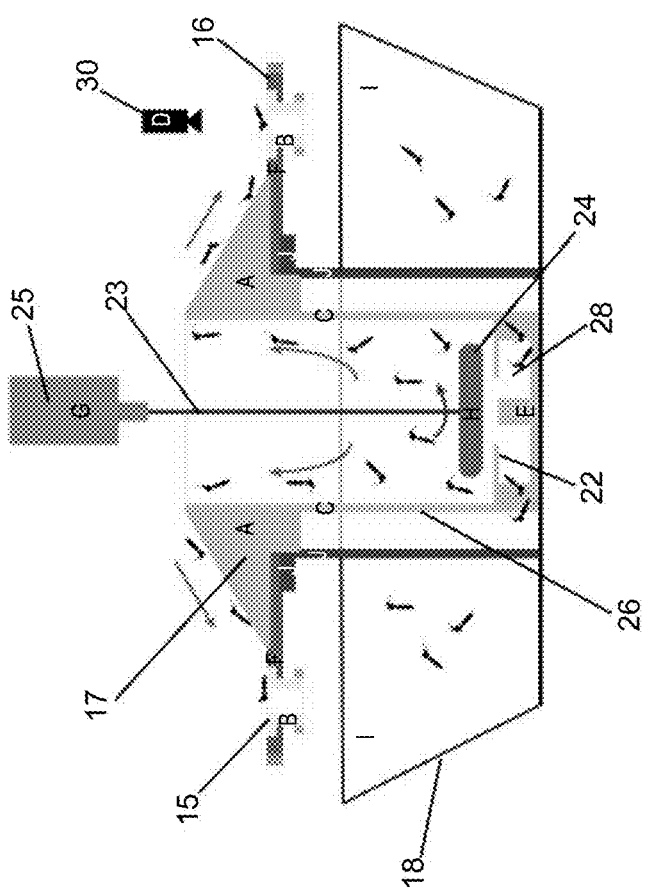
FIG. 6 shows a dispensing apparatus using a vortex to lift mosquitoes according to embodiments.
Figure 7:
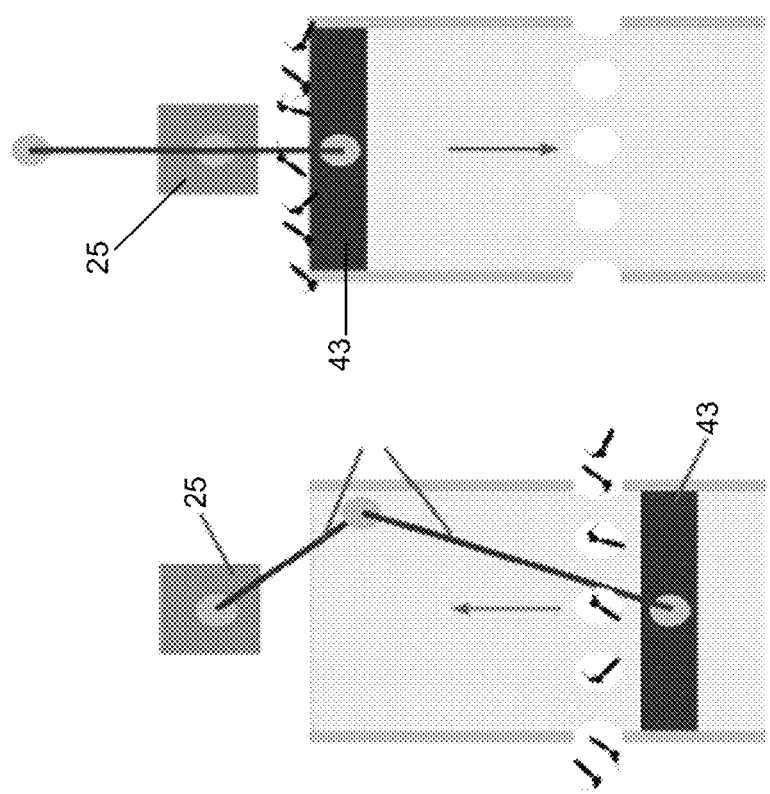

Instead of manually arranging the mosquitoes, the dispensing apparatus 86 can perform the semi-automated or automated mosquito distribution. Dispensing apparatus 86 can include a bowl 18 (e.g., a basin) containing mosquitoes suspended in a liquid medium. As shown in FIGS. 6-7, dispensing apparatus 86 can include a means for lifting the mosquitoes from the bowl 18 to a cone module 17 (e.g., a cone-like separation apparatus, a cone separator, a cone module, a cone, etc.) down which mosquitoes can flow, through channels 19, and into the cups 15.

In some embodiments, as shown in FIGS. 1 and 3-5, the computer vision system 29 can include the computer vision apparatus 30 (e.g., an orientation camera, a vision apparatus, a video camera, etc.) configured to detect mosquitoes. The computer vision system may also detect a position, and an orientation of the mosquito within the system, subsystems, or various areas of the system. With reference to FIGS. 4 and 5, the computer vision apparatus 30 can determine the number of mosquitoes in the cup 15, and determine the orientation of the mosquitoes in the cup 15. In some embodiments, the orientation apparatus 87 can include cup rotation actuators 21 that can reorient each cup 15 so that the robotic pick-and-place apparatus 80 can grasp a proboscis 14 of an oriented mosquito 10 for transport to the dissection subsystem 83. In some embodiments, a carousel 116 can rotate about its axis so that the cups 15 can advance through the field of view of the computer vision apparatus 30, orientation apparatus 87, robotic pick-and-place station 90, and cup cleaning station 70 oriented around the cone module 17 of dispensing apparatus 86.

In some embodiments, a robotic pick-and-place apparatus 80 can grasp the proboscis 14 of the oriented mosquito 10 and place the mosquito so that its neck 13 is between blades 71 (i.e., for cutting) in the decapitation station 85 in the dissection subsystem 83. The robotic pick-and-place apparatus 80 can hold the proboscis 14 during decapitation and subsequently transport the proboscis 14 (with the head attached) to a head disposal station 168 with head disposal apparatus 167.

In some embodiments, the robotic pick-and-place apparatus 80 comprises a three degrees-of-freedom robot that can be equipped with a gripper mechanism 81. In other embodiments, the robotic pick and place apparatus 80 can include a robot with more degrees of freedom. For example, it may include one or more rotational degrees of freedom to facilitate grasping the mosquito's proboscis 14 from different approach directions. The gripper mechanism 81 can be specialized for the combined mosquito staging and dissection system. For example, the gripper mechanism 81 can be a micro-gripper or a special-purpose gripper adapted from 23 gauge retinal surgery forceps (FIG. 18 and FIG. 16). The robotic pick-and-place subsystem 88 or computer vision system 29 can include computer vision apparatuses 30, for example, an overhead camera 72 positioned above the mosquito staging subsystem 82, that can locate a mosquito accurately in a stall 7 or on an oriented cup 15 and can provide guidance to the robotic pick-and-place apparatus 80 during grasping and transport to the dissection subsystem 83. The overhead camera 72 can additionally provide error checking capabilities.

In some embodiments, the computer vision system 29 can include additional computer vision apparatuses 30, for example, an onboard camera 73 positioned below the overhead camera 72 and/or a behind blade camera 74 positioned at the decapitation station 85. The computer vision apparatuses 30 can provide additional guidance to the robotic pick-and-place apparatus 80 as the mosquito advances through the mosquito staging subsystem 82 and the dissection subsystem 83 and/or general monitoring of the mosquito staging and dissection system.

With reference to FIGS. 1 and 3-5, in some embodiments, the dissection subsystem 83 can decapitate the oriented mosquito 10, and extract and collect the salivary glands from the mosquito. The dissection subsystem 83 can include a decapitation station 85 at which a decapitation apparatus 84 can remove the head of the oriented mosquito 10. The decapitation apparatus 84 can have a plurality of blades 71 (e.g., a cutting assembly). At the extrusion station 50 following the decapitation station 85, the salivary gland extrusion apparatus 51 can squeezes the thorax 11 of the decapitated mosquito to extrude the salivary gland from the thorax 11 and collect the extruded material.

In some embodiments, extrusion apparatus 51 can be integrated with collection apparatus 60 in a combined extrusion/collection station 50, 61 in the dissection subsystem 83, or these components can be placed separately, with the collection station placed to do collection after extrusion in the system work flow. In some embodiments, the extrusion apparatus 51 and the collection apparatus 60 can be placed into separate stations or can be integrated further with the cleaning and disposal apparatus 67 in the cleaning/disposal station 68. The cleaning and disposal apparatus 67 can remove the body of the mosquito, along with any debris. In some embodiments, a transport mechanism 52 can transport a cartridge 20 (i.e., a transport cartridge), which can transfer the mosquito 10 between stations in the dissection subsystem 83. In some embodiments, the cartridge 20 can be integrated into the transport mechanism 52 and/or work with the robotic pick-and-place apparatus 80 to position the mosquito 10 in the dissection subsystem 83.

The cartridge 20 can be stainless-steel to reduce wear and tear. A single stainless-steel cartridge 20 can be used multiple times in a day and can be easily cleaned before each use. In some embodiments, the cartridge 20 and/or other portions of the dissection subsystem 83 and staging subsystem 82 can be injection-molded or otherwise disposable. The plastic components can be opaque white or another color to provide contrast with mosquitoes. Disposability can reduce or eliminate the need to clean pieces between each production shift or cycle.

In some embodiments, the carousel 116 can replace the transport mechanism 52 and the cartridge 20 in other systems with multiple slots around the periphery, thus permitting continual advancing without the necessity of returning the cartridge carriage to a starting position after some number of mosquito dissection system operations.

The cleaning and disposal apparatus 67 can be included in the cleaning station 68. The used carcass 9 and other debris can be removed by a combination of one or more of washing, physical brushing, and suction. In some embodiments, the cleaning apparatus 67 can include a rotary cleaning brush with vertical motion, air dispensers, water dispensers, and/or a head suction system.

With reference to FIGS. 4-5, the carousel cleaning station 70 can wash any mosquitoes that cannot be reoriented for pickup from the cups 15 back into the bowl 18 of the dispensing apparatus 86. Typically, the fluid used will be compatible with the fluid in bowl 18. This situation can arise when more than one mosquito has been dispensed into a single cup 15 in ways that it is impractical for the robotic pick-and-place apparatus 80 to transfer them to the dissection apparatus or if a mosquito is too badly damaged to be picked up. In some embodiments, the computer vision apparatus 30 can include a camera positioned at the carousel cleaning station 70 to monitor cleaning.

Mosquito Staging Subsystem Workflow

In some embodiments, the mosquito staging subsystem 82 can be designed so that several functions can be performed concurrently around the periphery of the carousel 116, which then can be advanced to permit subsequent steps at different stations. This workflow is most easily described by following the progress of one orientation cup 15 around the staging apparatus. Here the cups 15 serve as staging areas.

Cup filling: The staging subsystem 82 in some embodiments has the ability to start and stop flow of mosquito-containing fluid from bowl 18 to the channels in cone module 17. When flow is obstructed, no mosquitoes can enter other portions of the staging apparatus. When flow is unobstructed mosquitoes enter the channel slides of cone module 17 and pass into cups 15. The motion of the carousel 116 can be paused or continued independently of whether the flow is obstructed. This permits the system to control the number of mosquitoes in each cup. The ideal number is one mosquito per cup, but some empty cups may be tolerated (in which case the carousel need not pause for the robotic pick-and-place apparatus 80 to transfer a mosquito to the dissection system. Similarly, if several mosquitoes are in a single cup and sufficiently separated so that the vision system can locate them and they are graspable, the carousel may pause for a longer period to permit several mosquitoes to be transferred, possibly with reorientation of the cup. If there are too many mosquitoes or the mosquitoes are ungraspable, the carousel may not pause, and the mosquitoes will be returned to the bowl 18 by the carousel cleaning station 70.

Orientation Determination: This step is performed when a cup 15 is within the field of view of the computer vision system 29, which can determine whether there is a single mosquito in the cup 15 and whether the cup 15 can be rotated so that the proboscis 14 can be grasped by the robotic pick-and-place apparatus 80. In other embodiments, permitting more than one mosquito to be retrieved from a single cup 15, the system can determine the orientation of all the mosquitoes and the appropriate cup 15 orientations to enable grasping. In this case, it is desirable that the cup rotator actuators 21 be configured so that cup can be reoriented when the cup is located in front of the dissection apparatus. In other cases, it may be desirable for the cup rotator actuators 21 to be positioned at a different position around the carousel 116 so that cup rotation may be performed while the robot pick-and-place apparatus is transferring another mosquito to the dissection apparatus.

Cup reorientation: The cup rotation actuators 21 can be engaged to reorient the cup 15 so that the mosquito is in the desired orientation for grasping. Depending on the amount of parallelism desired, this can be performed before the turntable 16 has moved the cup 15 away from the orientation station 89. Alternatively, this can be performed while the cup 15 is at an intermediate step between the orientation station 89 and the robotic pick-and-place station 90, or at the robotic pick-and-place station 90. For single mosquito picking, cup 15 reorientation can be performed between orientation station 89 and the robotic pick-and-place station 90 to permit the greatest degree of parallelism. Cup 15 reorientation can be performed at the robotic pick-and-place station 90 in situations in which it is desired to pick multiple mosquitoes from a single cup 15. The choice can depend on the relative time required for each individual step and can be implemented by a suitable arrangement of stations and/or apparatuses around the carousel 116.

Transfer: Robotic pick-and-place apparatus 80 can transfer of the mosquito 10 to the dissection subsystem 83. In performing this step it is advantageous to drag the mosquito across the cup and the cartridge portion of the dissection system so that the legs and wings fold down next to the mosquito's body, in order to facilitate the placing of the mosquito's neck 13 between the decapitation blades 71. It is also advantageous if there is a small amount of fluid present, in order to facilitate the folding process.

Cleaning: The carousel 116 can be cleaned to wash excess or poorly situated mosquitoes back into the bowl 18.

An example method is provided for extracting salivary glands from a multiplicity of mosquitoes. In an embodiment the method comprises the steps of dispensing a multiplicity of mosquitoes to a staging area 6 in the mosquito staging subsystem 82 in oriented states suitable for grasping the proboscis 14 of the mosquito by a robotic mechanism; using the robotic mechanism to transfer each mosquito to an automated dissection subsystem 83; and using the dissection subsystem 83 for decapitating each mosquito and extracting the salivary glands. In some embodiments the placement of mosquitoes is done manually by a human operator (e.g., in FIGS. 1 and 3) and in others (e.g., FIGS. 4 and 5) it is done by an automated dispensing apparatus 86.

Mosquito Staging Subsystem

Dispensing Apparatus

In some embodiments as illustrated in FIG. 1 and FIG. 3 for example, the mosquito staging subsystem 82 includes manually oriented mosquitoes 10. A sideways orientation of the mosquitoes can be desirable for PfSPZ yields, correlating with better extrusion. Manual grasping of a proboscis 14 (FIG. 2) can be easily performed by a relatively unskilled human operator as the mosquito's neck 13 does not need to be in a particular position for decapitation. Tweezers can be used to grasp individual mosquitoes by the proboscis 14 and arrange them on the turntable 16. The oriented mosquitoes 10 can be arranged such that the proboscis 14 is directed radially outward from the center of turntable 16. The orientation of the mosquitoes does not have to be exact. A mosquito merely needs to be oriented well enough so that the robotic pick-and-place apparatus 80 can grasp its proboscis 14. In some embodiments, an orientation within 45 degrees of a true radial direction may be sufficient.

With reference to FIG. 3, the operator can manually arrange the mosquitoes into individual staging compartments, such as stalls 7, arranged around the outer edge of the turntable 16. Multiple operators can perform the orientation step in a single mosquito dissection system. Alternatively, a single operator can perform the orientation step at multiple mosquito dissection systems while each system concurrently performs the other steps, which can take less time than staging oriented mosquitoes 10. In this embodiment, the dispensing apparatus 86 and/or the orientation apparatus 87 might not be needed. Further, higher magnification can be required for collecting extruded glands as compared to decapitating the mosquitoes. As such, an embodiment can include multiple stations with individual microscopes of varying magnifications.

In some system configurations such as those in FIG. 1 and FIG. 3, an operator can place a mosquito onto the staging area 6 at a rate of approximately 3-4 seconds per mosquito. This can yield a net throughput of the entire mosquito combined mosquito staging and dissection system of 12-15 mosquitoes per minute (e.g., 720-900 per hour). A slower manual placement rate, such as approximately six seconds per mosquito, which can yield a net throughput of the entire mosquito combined mosquito staging and dissection system of 10 mosquitoes per minute, can be at least a twofold increase over an average fully manual rate per operator. Moreover, the nature of operator involvement in the process is unlikely to induce as much fatigue as in a fully manual mosquito combined mosquito staging and dissection system. The proposed process can also produce greater consistency in the placement and dissection of mosquitoes, e.g., as compared to manual processes or the sAMMS process. This increased consistency can further facilitate process optimization and improve yield and efficiency. In some embodiments, the net throughput of the entire systems described herein, may be at least 500 mosquitoes per hour, preferably at least 600 mosquitoes per hour, more preferably at least 720 mosquitoes per hour, or most preferably at least 900 mosquitoes per hour. In some embodiments, the net throughput of the entire systems described herein, may be at least 1000 mosquitoes per hour, or may be less than 1000 mosquitoes per hour and inclusive of the ranges between the aforementioned endpoints With reference to FIGS. 5-7, in some embodiments, the dispensing apparatus 86 of the staging subsystem 82 can include a bowl 18 containing the mosquitoes in a liquid medium, a lifting apparatus to raise the mosquitoes from the bowl 18 to a cone module 17, the carousel 116 containing the cups 15 on a staging area 6 of the carousel 116, and the computer vision apparatus 30.

The bowl 18 can be a container containing the mosquitoes and liquid medium. The bowl 18 is configured so that the lifting apparatus can raise mosquitoes from the bowl 18 to the cone module 17 and so that mosquitoes can be washed back into the bowl 18 at the turntable or carousel/cup cleaning station 70.

The lifting apparatus can lift the mosquito/medium slurry from the bowl 18 to the cone module 17. Any appropriate means or mechanism known in the art can be used for this purpose, so long as it does not excessively damage the mosquitoes.

In some embodiments, the lifting apparatus can include a rotary vortex apparatus 22 as shown in FIG. 6. This mechanism can include a rod 42 with a fan-shaped rotor 24 that extends into the bowl 18 and a motor 25 (e.g., a driving servomotor for carousel 116). The rotary vortex apparatus 22 further comprises a tube 26, surrounding the rotary vortex apparatus 22, which is placed in the tube 26. The tube 26 is equipped with a bottom wall 27 that has a center hole to allow the mosquito/medium slurry to advance. The tube 26 support can be a frame structure seating on the ground of the bowl 18. The fan-shaped rotor 24 reaches deep into the water and is concentric with the tube 26. A DC motor can actuate the high-speed spin of the fan-shaped rotor 24. The rotating fan-shaped rotor drives the water inside the tube 26 tangentially to the tube walls 27. Consequently, the centrifugal force drags the water toward the tube wall 27 and water climbs up to reach the equilibrium point at which the combination of the gravity, water pressure, and centrifugal force is zero along the water profile. When the spinning speed is high enough, the water can overflow the top of tube 26 and flow back to the bowl 18 after pouring over the cone module 17 and carousel 116 surfaces, which means the water level in the bowl 18 can remain constant.

In some embodiments, as shown in FIGS. 7A-B, an alternative method for lifting can be the piston pump 43. This approach can result in mosquitoes moving onto the cone module 17 and to other components of the staging subsystem discretely rather than through a continuous flow, which might be preferred for easier sequencing and processing of mosquitoes after they are delivered. Due to the discreteness of delivery, using a piston pump 43 can be slower than the rotary vortex apparatus 22, requiring higher concentrations of mosquitoes and additional stirring to guide mosquitoes into the tube 26 for a high rate of transport.

Another lifting device is an Archimedes screw pump (not shown) positioned vertically so that it is concentric with the tube shaft.

With reference to FIGS. 5 and 8, in some embodiments, the cone module 17 can separate mosquitoes emerging from the lifting apparatus and distributes them along positions on a carousel 116 that rotates relative to the cone module 17. In an embodiment, the positions comprise seats 44 with cups 15 that are rotatable to receive one or more mosquitoes. As shown in FIG. 5, the surface of the cone module 17 (e.g., its shape) is narrow at the top and wide at the bottom. Therefore, water brought to the top of the cone module 17 and the mosquitoes in it can flow away from each other as the mosquito/medium slurry pours down the cone module 17 and into the cone channels 19, separating the mosquitoes.

As shown in FIG. 8, in some embodiments, high, thick walls 27 can be affixed to the cone module 17 to help align mosquitoes effectively as they spill out of the top. These walls 27 can leave a multiplicity of small spiraling channels 19 that grow narrower near the base of the cone module 17 for the mosquitoes to follow, guiding them into the small cups 15 to be oriented. The curved shape of these channels 19 can be designed to be consistent with the free fluid flow trajectory on a smooth cone module 17 without additional structures for the sake of reducing the collision between water flow and the walls of channel 19, which can induce turbulence along the flow affecting the motion of mosquitoes. The tangent vector of the channel 19 centerline can first points along the tangent of the top of the tube 26 and then gradually curves back approaching the radial direction of the cone module 17. A parabola can model the general shape of the channel 19 with a solid physical model. The fluid at the top of the tube 26 can have a high tangent velocity plus near zero radial velocity, and these velocities can decrease and increase respectively due to the work by friction and gravity.

The channel 19 curve orientation can match the situation when the fan-shaped rotor 24 spins clockwise. The number of the channels 19 and the width at the end of each slide is determined by the number of cups 15 to be reoriented in the carousel 116.

In some embodiments, a mechanism or other means can be installed so that the flow into one or more of the slide areas can be obstructed, such that mosquito slurry cannot enter the slide corresponding to a cup 15 when the carousel 116 is in a particular position for reorientation. This can be done by a simple barrier or by an active gating mechanism.

The carousel 116 for reorientation shown in FIGS. 9A-B can contain a multiplicity of seats 28, designed to receive cups 15 for reorientation that receive mosquitoes from the channels 19. Cut rotation actuators 21 can rotate the carousel 116 through the multiple stations of the staging subsystem. In one embodiment, the carousel 116 can be attached to the bottom of the cone module 17, and can rotate with the cone module 17. In another embodiment, the carousel 116 can rotate independently. The flow can be turned off while the carousel 116 rotates between stations and the flow is turned back on when the cups 15 are aligned with the slides of the cone module 17. FIGS. 9A-B shows a possible embodiment of the rotation mechanism for carousel 116, although other suitable mechanisms can be used to rotate the carousel 116, as will be obvious to one of ordinary skill in the art. FIGS. 9A-B show a simple gear/servomotor combination, and FIG. 10 shows a cam-driven rocker arrangement, in which stick-like pushing links (e.g., with ridge 36, stick driving stepper motor 37, ring positioning stick 38, ring driving gear 40, positioning torsion spring 41) press against the sides of the cone module 17 slides.

Orientation Station with Orientation Apparatus

With reference to FIGS. 9A-B, in some embodiments, the system can include an orientation apparatus 87. The cups 15 rest on seats 28 for orientation or reorientation in the carousel 116. The horizontal surface of each cup 15 can include a mesh that is coarse enough to enable the medium fluid to pass through easily but fine enough to retain a mosquito and fine enough so that the legs, proboscis 14, and wings of the mosquito do not become entangled. A computer vision apparatus 30 observes the orientation of the mosquito and a servo-controlled mechanism 31 (e.g., an orientation cup driving gear) reorients the cup so that the mosquito's proboscis 14 points toward the outer rim of the carousel 116, in a pose suitable for the gripper mechanism 81 of the robotic pick-and-place apparatus 80 to grasp it. In an embodiment, the reorientation is done at a single station around the carousel 116, so that the reorientation mechanism must be disengaged while the carousel 116 is rotating. As shown in FIG. 9B, a small servomotor 35 can drive the carousel 116. Another servomotor 34 can drive a rack-and-pinion mechanism to engage/disengage an orientation the servo-controlled mechanism 31 with the teeth of a driven gear 32 on the outside of the orientation cup 15. However, other suitable mechanisms can be used, as will be apparent to one of ordinary skill in mechanical design.

Computer Vision System with Computer Vision Apparatus

With reference to FIGS. 11-12, in some embodiments, the computer vision system 29 can include computer vision apparatuses 30 provide additional guidance to the robotic pick-and-place apparatus 80 as the mosquito advances through the mosquito staging subsystem 82 and the dissection subsystem 83 and/or general monitoring of the mosquito combined mosquito staging and dissection system. For example, computer vision apparatus 30 can be the onboard camera 73, the overhead camera 72 and/or the behind blade camera 74. Tasks for the computer vision system 29 can include mosquito detection (needed to initialize the other steps); proboscis 14 localization (needed for the robot to grasp the proboscis); mosquito head 12 and neck 13 localization (needed for the robot to place the neck 13 precisely between the blades); and orientation detection to determine if the mosquito is lying on its left or right side. This can be important to determine because a sideways orientation of the mosquitoes can increase PfSPZ yields at the extrusion stage. As shown in FIG. 11, the computer vision apparatus 30 can perform these tasks for at least one mosquito in the cup staging area 15. As shown in FIG. 12, the computer vision apparatus 30 can perform these tasks for at least one mosquito 10 oriented with its proboscis 14 radially outward from the center of turntable 16.

With reference to FIG. 12, computer vision apparatuses 30 with optimized view angles can be used to observe some or all of the stations in the dissection subsystem 83. In some embodiments, the computer vision apparatuses 30 can use an Image Processing algorithms and integrate with the system controller using Robot Operating System software interfaces. As shown in FIG. 13 and FIG. 21, vision tasks can include: (A) mosquito detection, (B) proboscis detection, (C) confirming the success of picking up the mosquito by the gripper, (D) detecting the mosquito's side-orientation for improved yield of ejected material after squeezing, (E) mosquito neck 13 detection for accurate positioning in the cutting apparatus, (F) verifying the mosquito's correct placement in the cutter blade, (G) confirming the successful decapitation of the mosquito, (H) confirming the successful cleaning of the gripper tool, (I) estimating the squeezed out volume of material during and after squeezing, and (J) confirming the successful cleaning of the turntable stall. In some embodiments, the Image Processing algorithms can comprise convolutional neural nets (CNNs) and other "deep learning" techniques known in the computer vision art, although other embodiments may use only other algorithms and techniques known in the art. The main criteria guiding selection of particular algorithms/techniques are robustness, accuracy, and computational efficiency.

In some embodiments, the computer vision apparatus 30 can include a video camera, with suitable illumination, and image processing software. As shown in FIG. 14, the computer vision apparatus 30 can have sufficient resolution to enable the mosquito's body parts to be readily distinguished while the camera's field of view is sufficient to cover at least one stall 7 or cup 15 on turntable 16. This subsystem can perform the following functions:

Identify the mosquitoes in a stall 7 or cup 15.

If there is a mosquito in the stall 7, determine whether the mosquito's proboscis 14 can be grasped by the robotic pick-and-place apparatus 80.

If there is a single mosquito in the cup 15, determine whether the mosquito's proboscis 14 can be grasped by the robotic pick-and-place apparatus 80. Optionally, make this determination for all mosquitoes in the cup 15.

Determine the orientation of a mosquito relative to the cup 15, so that the amount of rotation of cup 15 required to align the proboscis 14 for grasping can be determined.

A computer vision algorithm can be used to perform these steps. One typical implementation based on traditional image processing methods uses the following strategy:

Step 0: Acquire image from the video camera.

Step 1: Mosquito Detection and Cluster Condition Classification: The basic structure for detecting the mosquito is the watershed algorithm [16]. The watershed algorithm can deal with overlapping on some level without too much additional computational cost. The watershed algorithm can be applied to produce a threshold image (see FIG. 15 (b)) and this proposes several candidate regions. For each identified region returned by the watershed algorithm, the region area and aspect ratio are employed to remove the false positive, i.e., the clustered mosquito (boxes in FIG. 15(c)). Since the watershed algorithm processes the image based on the grayscale of each pixel, a good contrast between the mosquito and the background is required. The body orientation can be obtained by calculating the second moment within each body Region of Interest (RoI) (green lines in FIG. 15(i)).

Step 2: Head Detection: Noticing the mosquito's head is circular and usually darker than other body parts, we implement Hough Circle Transform (HCT) [17] to detect the head position. However, directly applying HCT to the body RoI (FIG. 15(d)) is problematic because the complex curvatures would induce false detections. Therefore, for each mosquito, two methods are further implemented, Body Removal and DBSCAN [18], to refine the RoI.

The goal of Body Removal is to remove the body. The result is shown in FIG. 14(e). Distance transform is first applied to Body RoIs (FIG. 14(c)) to find the center region of the body and then erode based on that region for a certain amount to get an erosion image. FIG. 14(e) is the difference between the body RoI (FIG. 14(d)) and the erosion image. It can be seen that the thorax part has been removed. Each mosquito is separated into two parts, the head part, and the abdomen part. DBSCAN then comes into play and clusters remaining regions into the head cluster, shown in white in FIG. 14(e) and the abdomen cluster, shown in grey in FIG. 14(e). This allows all false positives to be eliminated in the abdomen part, where most false detection occurs. The final step is to use a Hough Transform [17] to determine the most likely head locations.

Step 3: Proboscis Orientation Detection: After heads are detected, a new RoI is defined for the detection of the proboscis orientation (purple boxes in FIG. 14(h)). Noticing that the proboscis shape often appears in a straight line, the Hough Line Transform (HLT) is used for the detection [19]. For the non-clustered mosquito, the proboscis is always connected to the head. Therefore, the distances from all line candidates to the head are calculated to remove the false line proposal. Among all remaining line candidates, we select the line whose endpoint is furthest from the head and connect the endpoint back to the head to detect the proboscis orientation.

Another embodiment, as shown in FIG. 15, uses machine learning methods, based on a training data set of labeled mosquito images. This method consists of the following steps:

Step 0: Acquire image from the video camera.

Step 1: Mosquito Detection and Cluster Condition Classification: To localize the mosquito and classify its cluster condition, neural network architecture, Mask R-CNN can be used. Mask R-CNN has achieved state-of-the-art accuracy on object detection benchmarks with a fast processing speed [20]. The same two-stage procedure of the Mask R-CNN architecture can be used. The first stage, the Feature Pyramid Network (FPN) backbone [21] is responsible for feature extraction over the entire image. For the second stage, the network head, the Mask R-CNN branches for class and bounding box prediction can be used. Combining the backbone and the head gives excellent and fast prediction of the location and cluster condition of each mosquito in an image (FIG. 15(b)).

Step 2: Body Part Detection: After all mosquitoes in the image are localized and classified, pose estimation for the non-clustered ones is performed (FIG. 15(c)). A network architecture designed for human pose estimation can be used, DeeperCut [22, 23]. Besides achieving state-of-the-art results in human pose estimation, DeeperCut has also proven to be effective in animal body part detection [24]. The network backbone is built based on the ResNet. The network head removes the final classification and adds deconvolutional layers to predict the spatial probability density of each body part. At the last stage of the network, it also performs location refinement to refine the body part detection accuracy. More details about the network architectures can be referred to [22, 23].

Another embodiment shown in FIG. 13 and FIG. 21, uses a hybrid image-processing (IP) and machine-learning (ML) based approach to guide the mosquito dissection process. In this embodiment, at least one of the computer vision tasks is implemented two ways, one IP-based implementation and one ML-based implementation, but every task has at least one implementation, either IP or ML-based.

The computer vision tasks that have both IP and ML-based implementations are first performed using the IP-based implementation, after which the result of the processing is analyzed and if the IP-based implementation failed to provide the expected result, the ML-based implementation is performed. The computer vision step with two implementations will only fail if both implementations failed to provide the expected result.

Alternatively, both the IP-based and ML-based implementations can be performed in simultaneously and the result of the one that provides acceptable result first be used.

Such a hybrid IP-ML implementation consists of the following steps:

Step A-1: Capturing Image A from the overhead camera of the vision system.

Step A-2: Detection of the next mosquito to be processed in Image A using either IP or ML-based implementation: As shown in FIG. 12, The IP-based implementation only searches for mosquitoes in a region of interest, an area where the mosquito may be located (e.g. the surface of a turntable near the decapitation apparatus), in which it first performs adaptive thresholding to localize dark blobs of image pixels then uses 2D binary morphology operators, such as erosion, to remove noise, then applies other 2D binary morphology operators, such as closing, to connect neighboring blobs of dark pixels into unified connected components, which connected components are then identified and filtered by shape and size that results in a detection of the bounding boxes of large dark areas of specified size, shape and orientation in the region of interest, each of them identifying a mosquito. The ML-based approach is implemented by solving an object detection problem with the Faster R-CNN neural network architecture in the Detectron2 framework, which features a pre-trained backbone network for feature detection that is fine-tuned during training, and a head layer that is fully retrained during training. The network is trained using hundreds of hand-labeled mosquito images. The ML-based method provides a list of bounding boxes in the region of interest, each identifying a mosquito. The IP-based method takes a significantly shorter time to process and has similar detection success rate, therefore the IP method is performed first, and the ML-based method is used as a backup. If there are multiple mosquitoes detected in the region of interest then the system outputs the bounding box that corresponds to the mosquito that is closest to the center of the region of interest.

Step B: Proboscis detection using either IP or ML-based implementation: Proboscis detection takes the bounding box of the mosquito detected in Step A-2 and Image A as its inputs. The IP-based implementation first uses 2D template matching to find the head of the mosquito inside the mosquito's bounding box, where the implementation may support multiple representative head-templates, of which the one with the highest matching score is selected. Normalized cross correlation is used as the similarity metric for template matching that provides a score for each pixel location within the search area in the range of $[-1, 1]$, where higher scores correspond to better matches. Then the immediate neighborhood around the head's location is converted into polar coordinate system that transforms straight lines radiating out from the head into horizontal straight lines, where the vertical coordinate of the horizontal lines can be mapped to corresponding angles in Cartesian image coordinates. The proboscis appears in the polar coordinate representation as a dark horizontal line on a lighter background that is detected by first projecting the polar coordinate representation into a column vector, then selecting the strongest narrow local minimum in the vector and calculating the radial angle corresponding to the vertical index of the detection in the column vector. Lastly the method calculates the base and the tip positions of the proboscis from the position of the head and the angle in which the proboscis was detected. The ML-based approach is implemented by solving multiple object detection problems with the Faster R-CNN neural network architecture in the Detectron2 framework, which features a pre-trained backbone network for feature detection that is fine-tuned during training, and a head layer that is fully retrained during training. The network is trained using hundreds of images on which mosquito body poses are hand-labeled. The network detects the positions corresponding to the base and the tip of the proboscis inside the bounding boxes representing the mosquito on the input image. The IP-based method takes a significantly shorter time to process and has similar detection success rate, therefore the IP method is performed first, and the ML-based method is used as a backup.

Step C-1: Capturing Image C from the overhead camera of the vision system.

Step C-2: Confirmation of successful pick-up of the mosquito by the gripper tool in Image C: This task is accomplished by using the mosquito detection method described in Step A-2. The mosquito is successfully removed from its initial position if the mosquito detection method cannot detect a mosquito in that area of the image.

Step D-1: Capturing Image D from the overhead camera of the vision system.

Step D-2: Detection of the mosquito's side-orientation in Image D: This method is only implemented using a ML approach. The neural network architecture used is ResNet152 that performs image classification. ResNet152 features a pre-trained backbone network for feature detection that is fine-tuned during training, and a head layer that is fully retrained during training. The network is trained using hundreds of images on which mosquitoes are lying either on their left side, right side, or another orientation. The method performs classification only in the designated region of interest on Image D where the mosquito was staged for this task. The network classifies the contents of the region of interest as either one of the three classes: left, right, or other. The combined mosquito staging and dissection system can use the mosquito's side-orientation to change the decapitation process for achieving better yield of sporozoites.

Step E-1: Capturing Image E from the overhead camera of the vision system.

Step E-2: Mosquito neck 13 detection in Image E for determining the offset between the gripper tool holding the mosquito and the mosquito's neck 13 using either IP or ML-based implementation: This method serves the purpose of guiding the robot holding the gripper mechanism 81 for accurate placement of the mosquito's neck 13 with respect to the cutting blade. The IP-based implementation uses the head detection capability described in Step B to locate the head of mosquito in the region of interest on Image E that shows the mosquito already staged by the robot near the cutting blade. The system only requires the offset between the gripper and the mosquito's neck 13 in one direction, perpendicular to the cutting blade, therefore the neck 13 position is determined only along that direction. The IP-based approach uses one or more image templates to determine the radius of the head. The neck 13 position is then determined along the direction perpendicular to the cutting blade by projecting the head position offset by the head radius on the direction vector. The ML-based method uses the pose estimation network described in Step B for finding the image coordinates of the mosquito's neck 13 inside the region of interest and then projects the neck 13 position on the direction vector perpendicular to the cutting blade.

Step F-1: Capturing Image F from the side-view camera of the vision system observing the cutter apparatus.

Step F-2: Verifying mosquito placement in the cutter blade in Image F: This computer vision task is implemented using an ML-based method. Due to the difficulty modeling all the possible placement error modes, machine a learning method is expected to yield best classification results. The neural network architecture used is ResNet152, that performs image classification. ResNet152 features a pre-trained backbone network for feature detection that is fine-tuned during training, and a head layer that is fully retrained during training. The network is trained using hundreds of manually classified and hand labeled images of mosquitoes placed in the cutter blade both correctly and incorrectly. The labels identify two classes: correct placement and incorrect placement. The method performs classification only in the designated region of interest on Image F that shows the close-up view of the immediate surroundings of the cutter blade. The network classifies the mosquito placement inside the region of interest in the input image as either correct or incorrect.

Step G-1: Capturing Image G from the overhead camera of the vision system.

Step G-2: Confirming the successful decapitation of the mosquito: This IP-based method aims to determine if the mosquito's head is still adjacent to the cutting blade (region of interest) after the cutting blade actuation and the gripper moved away from the cutting apparatus for the disposal of the head. The cutting blade is in a known location in Image G and the appearance model of the cutting apparatus without the mosquito present is stored as the background template. The IP-based method matches the area on the image adjacent to the cutting blade to the background template and if Image G appears similar to the background in the region of interest, then the method reports that the head was removed. Otherwise, if the image does not match the background template in the region of interest then the head, or some parts of it are still near the cutting blade and the decapitation was likely unsuccessful.

Step H-1: Capturing Image H from the overhead camera of the vision system.

Step H-2: Confirming that the gripper tool is clean after the disposal of the mosquito's head in Image H: This computer vision task is implemented using an ML-based method. The neural network architecture used is ResNet152, that performs image classification. ResNet152 features a pre-trained backbone network for feature detection that is fine-tuned during training, and a head layer that is fully retrained during training. The network is trained using hundreds of images of the open gripper tool with either the proboscis 14 and the mosquito head 12 attached or detached. The method performs classification only in the designated region of interest on Image H where the gripper tool is staged for this task. The network classifies the contents of the region of interest as either one of two classes: gripper clean or gripper dirty.

Step I-1 Capturing Image I from the side-view camera of the vision system observing the squeezer apparatus.

Step 1-2: Confirmation of mosquito squeezing and estimation of blob volume in Image I: The task is implemented using IP-based methods. The region of interest of Image I that shows the side view of the cutting squeezing apparatus where the blob of material gets ejected during squeezing is known as the camera's position with respect to the squeezer apparatus is fixed. The background of the region of interest is designed to appear bright when only the apparatus is visible without a mosquito in the view by placing a flat white plastic surface on the side of the apparatus distal to the camera. The method analyzes the region of interest in the image and measures the size of the dark blob in front of a bright background. The method assumes a symmetrical volume and based on that assumption it estimates the volume of the dark blob in cubic millimeters.

Step J-1: Capturing Image J from the camera of the vision system observing the turntable stall cleaning apparatus. Image is captured after the cleaning apparatus moved away from the stall to reveal the stall in the camera's field of view but before the turntable's rotation is advanced to the next position.

Step J-2: Confirming that the turntable is clean in Image J: The task is implemented using IP-based methods, which compare the image of the stall in the region of interest to a template image that depicts a clean turntable and stall. The template is matched against the stall and classified as clean if the match score is higher than a previously determined threshold value or dirty otherwise. If classified dirty, the cleaning apparatus can be commanded to repeat the cleaning cycle of the stall.

In the current embodiment, two computer vision apparatuses 30 are used for the pick-and-place computer vision apparatus 30, as described above. This arrangement can have several advantages. The overhead camera 72 provides an overview with sufficient resolution and detail to enable the robotic pick-and-place apparatus 80 to reach the desired pick up point on the proboscis 14. The overhead camera 72 provides a higher resolution image with an easily calibrated, fixed relationship to the gripper mechanism 81. This permits fine adjustments of the pickup point and monitoring of the mosquito during the process.

Any suitable computer vision algorithms can be used for this purpose, so long as the proboscis 14, neck 13, and head 12 of the mosquito can be accurately located for grasping. Two possible algorithms for grasp point determination are those described for the computer vision apparatus 30 used in the staging subsystem 82. These can also be adapted to verify the location of the neck 13 relative to the decapitation blades 71 in stage three of the procedure described above. Machine learning methods can also be adopted to monitor the motion of mosquitoes while being transported between the pickup and decapitation points. To do this, the system would be trained by performing many pick-and-place operations with multiple mosquitoes while video is recorded. Success or failure would be recorded for each trial. A convolutional neural network would then be trained to distinguish between successful transport and failure.

Robotic Pick-and-Place Station with Robotic Pick-and-Place Apparatus

With reference to FIG. 16, the basic requirements for the robotic pick-and-place apparatus 80 can be that the robot has sufficient precision, dexterity, degrees-of-freedom (DOF), and work volume to grasp an approximately oriented mosquito 10 from a stall 7 or a cup 15 of the mosquito staging subsystem 82 and transfer it to the decapitation station 85 so that the neck 13 is appropriately aligned with the blades 71 of the dissecting apparatus or alternatively appropriately positioned relative to a laser, air, or water jet performing the decapitation. In performing the pick-and-place action, it is advantageous it to drag the mosquito along a surface so that the wings and legs of the mosquito fold down against the body, in order to facilitate placing the neck 13 between the decapitation blades 71 or otherwise relative to the decapitation apparatus. It is also advantageous if there is a small amount of fluid present, in order to facilitate the folding process Once the neck 13 is in position, the blades 71 can act on the oriented mosquito 10, decapitating it. The robotic pick-and-place apparatus 80 can still hold the proboscis 14 and transfer the head 12 to the head disposal apparatus 167 for disposal, which can comprise one or more components, including a disposal bin, suction device, fluid jet, air jet, or fluid pool. Disposal may be accomplished by opening the gripper so as to drop the head and proboscis into a bin, or this process may be supplemented by one or more of several means, including suction, air or water jets, mechanical brushing, or dipping into a pool of water in the disposal bin. A computer vision system may be used to verify that the head has been released from the robot's gripper. If it has not been released, any of the above methods may be used to retry or supplement the first attempt. It may be advantageous to try a fast and simple drop into the disposal bin first, and then only resort to a slower dipping into a pool if the first attempt fails. Concurrently with head disposal, the turntable 16 can advance (e.g., at five degree intervals or another interval corresponding to the positions of the stalls 7 on turntable 16) to place a stall 7 containing a mosquito to be decapitated in front of the decapitation blades 71.

FIG. 16 provides an example embodiment in which the robotic pick-and-place apparatus 80 and decapitation station. The robot can be a 4-DOF, linear stage robot available from New England Affiliated Technologies, Lawrence, Mass. A Cartesian stage 75 having a dual-axis X-Y table, can be used as the base for the robot, onto which a Z axis is mounted orthogonally (NEAT: XYR-6060 and NEAT: LM-400, respectively). The robot also has a rotary axis which may optionally be used to reorient the gripper mechanism 81 to accommodate a larger range of proboscis 14 angles for grasping. However, any robot and controller with at least 3-DOF and sufficient precision can be used. In the embodiments shown, each robot axis is driven by a DC servo motor, with a leadscrew, has a travel of 100 mm, and is coupled with an incremental encoder. The positioning resolution of these axes was measured with a dial indicator to be approximately 10 micrometers. The entire assembly is mounted to an optical table. Robot motion is driven by a Galil Motion, Inc. controller (DMC-4143), interfaced to a Linux computer by ethernet connection. Attached to the robot is a gripper mechanism 81 as shown in FIG. 16 (C). The gripper mechanism 81 can be a custom-designed micro-gripper. A cam mechanism attached to a HexTronik HXT900 servo motor drives the rail of a linear guide within its carriage, causing the tooltip to open and close. The tooltip of the micro-gripper can be adapted from an Alcon Grieshaber retinal surgical forceps, e.g., 23 gauge retinal surgery forceps (FIG. 18). Movement of the linear guide rail extends or retracts a sleeve over normally-open gripper jaws. The gripper mechanism 81 can be controlled by sending position commands to the servo motor via USB serial communication from the computer to an Arduino Uno microprocessor.

The operation of robotic pick-and-place apparatus 80 with guidance from computer vision system 29 having one or more computer vision apparatuses 30 can be shown in an example. The example can describe a pick procedure and a place procedure.

The computer vision apparatuses 30 including an overhead camera 72, e.g., the microscopic camera (OptixCam Summit D3K2-5) with an Omano OM-10K zoom lens, can be used to capture a complete view of the workspace and is used by the computer vision apparatus 30 to identify a mosquito's presence and approximate location. The onboard camera 73, e.g., the Plugable USB Microscope Camera, can be mounted on the robotic pick-and-place apparatus 80 and is used to identify the location of the mosquito's body parts for accurate picking and placing. The behind blade camera 74, e.g., the Opti-Tekscope USB Microscope Camera, can be placed to the side and rear of the setup so that its visual field is in line with the blades 71. The behind blade camera 74 can be used to visualize placement so the tester can determine if a trial was successful. The specific choice of cameras is not crucial. Any collection of video cameras with appropriate magnification, resolution, and field of view may be used to accomplish the purposes of the vision system. Further, additional cameras may be added as needed.

The automated procedure can use the overhead camera 72 and the onboard camera 73 to guide the motion of the robotic pick-and-place apparatus 80. The procedure consists of three stages. In the first stage, an image of the entire workspace is captured using the overhead camera 72. This image is converted to HSV space, and the mosquito is segmented out. Next, a bounding box is fit to this region and a weighted centroid is calculated for the mosquito, as shown in FIG. 17(a). The gripper mechanism 81 can be moved near the mosquito, to a position where the onboard camera 73, due to its proximity, can capture an image of the mosquito with more features and details.

In the second stage, a computer vision algorithm can identify the mosquito's proboscis 14 in the detailed onboard camera 73 image shown in FIG. 17(b). The gripper is moved to a point above the centroid of the proboscis (FIG. 17(c)), which is used as the grasp location for the mosquito (FIG. 17(d)). Finally, the robotic pick-and-place apparatus 80 can drag the mosquito to an empty slot 23 on a cartridge 20 or to the narrow part of a stall 7 on turntable 16.

In the third stage, the onboard camera 73 captures a final image shown in FIG. 17(e) with the gripper mechanism 81 in view to detect the mosquito head-to-gripper offset. The robotic pick-and-place apparatus 80 uses this offset value to position the mosquito with its neck 13 between the dissection blades 71 (FIG. 17(f)).

Further details of the pick-and-place components of this subsystem are described below.

Pick Procedure: A mosquito is assumed to be placed anywhere on a staging area (e.g., on an orientation cup 15 or stall 7), with its proboscis 14 pointing forward approximately toward the fingers of the gripper mechanism 81, within approximately 45 degrees of a line from the axis of the gripper mechanism 81. In some embodiments involving orientation cups, the diameter of the orientation cup 15 was approximately 10 mm, and the center of the cup 15 center was approximately 23 mm from the decapitation blades 71. However, these dimensions can be modified, so long as the robotic pick-and-place apparatus 80 can perform the required pick-and-place operation. A typical placement is shown in FIG. 17(a). In experiments using one embodiment, the gripper mechanism 81 can have a micro-gripper tooltip and can begin the trial at a location away from the cup 15 and approximately 3.5 mm above the surface of the cartridge 20. Again, the dimensions can be modified as long as the robotic pick-and-place apparatus 80 is able to perform the required pick-and-place procedure. The requirements for the case of a staging area such as the stalls 7 are similar. The mosquito must be within reach of the robotic pick-and-place apparatus 80 and aligned so that the proboscis can be grasped by gripper mechanism 81. In other embodiments (not shown) additional degrees of freedom may be added to the robot to enable it to grasp mosquitoes with more widely varying orientations. One advantage of such an embodiment is that it can enable mosquitoes to be grasped from a an open repository such as a shallow pool, puddle, or shelf located in proximity to the turntable 16, thus eliminating the need for manual placement of mosquitoes into the stalls of turntable 16.

A bounding box around the mosquito is identified by computer vision apparatus 30 in an image from the overhead camera 72, and the robotic pick-and-place apparatus 80 moves to a point approximately 5.0 mm in front of the centroid of that region (FIG. 17(b)). This brings the mosquito into view of the onboard camera 73 without placing the gripper mechanism 81 over top of the mosquito body. By lowering approximately 3.0 mm toward the mesh surface, the mosquito is brought into focus. The centroid of the proboscis 14 region is identified and the robotic pick-and-place apparatus 80 moves the gripper mechanism 81 to a location approximately 2.0 mm above this point (FIG. 17(c)), and then drops down to the mesh surface and the gripper mechanism 81 is closed to grab the proboscis 14 (FIG. 17(d)). As discussed above, these dimensions can be modified so long as the robotic pick-and-place apparatus 80 is able to perform the required pick procedure.

The robotic pick-and-place apparatus 80 lifts up approximately 0.8 mm and drags the mosquito to a position approximately 1.5 mm from the blades 71 (FIG. 17(e)). Here, an image from the onboard camera 73 is again analyzed by the computer vision apparatus 30. This task serves two functions, to confirm successful grasping of the mosquito, and to determine more accurately where on the proboscis 14 the gripper mechanism 81 has grabbed. The trial is considered a successful demonstration of grasping if the mosquito is visualized as grasped within the micro-gripper tooltip of the gripper mechanism 81 at this point.

Place Procedure: The computer vision apparatuses 30 can depict a side view of the robotic pick-and-place apparatus 80 path and related representative images captured by the computer vision apparatuses 30: (a) image captured from overhead camera 72 showing bounding box of detected mosquito; (b) image captured from onboard camera 73 to determine proboscis 14 centroid; (c) image captured from onboard camera 73 before grasping; (d) image captured from onboard camera 73 immediately after grasping; (e) image of the mosquito taken used to calculate head-to-tooltip of the gripper mechanism 81 offset; and (f) image after aligning the mosquito neck 13 with the blades 71. The routine identifies the location of the proximal end of the proboscis 14, where it attaches to the mosquito's head 12. This location is transformed into robotic pick-and-place apparatus 80 coordinates and a head-to-tooltip offset is determined by subtracting it from the current encoder values. Only the offset in line with the cartridge 20 grooves (a horizontal offset in FIG. 17(e)) is considered. The robotic pick-and-place apparatus 80 then executes another set of programmed movements. The robotic pick-and-place apparatus 80 raises the mosquito head 12 approximately 1.3 mm and moves forward a nominal distance to clear the blades 71 plus the offset, such that the mosquito's neck 13 should be right above the blades 71 (FIG. 17(f)). Then the tooltip moves down approximately 3.0 mm, placing the neck 13 within the notch of the blades 71 if properly aligned. At this point, another subsystem of the automated dissection subsystem 83 actuates the blades 71 to cut the head 12 and further process the mosquito.

Dissection, Extrusion Collection, and Disposal Subsystems

Decapitation Station with Decapitation Apparatus

With reference to FIG. 19, in the sAMMS device, disclosed in U.S. Patent App. Pub. No. 2017/0355951 (incorporated herein by reference in its entirety), the means for accomplishing the decapitation step at the decapitation station 85, the squeezing and collecting steps in the extrusion apparatus 51 and the collection apparatus 60, and the cleaning step at the collection station 61 can be incorporated into the disclosed device.

In some embodiments, mosquitoes can be staged for dissection on a modified sAMMS device [14, 15] that can incorporated into the dissection subsystem 83. The sAMMS cartridge 20 can be modified to have a hole approximately 23 mm away from the blades 71 in which an approximately 20 mm diameter cup is placed that matches the one used in the upstream mosquito staging subsystem 82. This cup is covered with a 750 micrometer nylon mesh that is used for media drainage in that apparatus. The mosquito is dragged into a slot 23 in the sAMMS cartridge 20 and placed into the sAMMS blades 71. The slots 23 can vary based on mosquito sizes. A relaxed fit for most mosquito sizes can be approximately 1.5 mm. Alternatively, the cup 15, mesh, etc. can be replaced by a simple shelf-like staging area.

The two linear blades 71 can be configured to decapitate a mosquito when the mosquito's neck 13 is placed between the blades 71 in a slot 23. Each blade 71 can be approximately 0.002 inches (0.051 mm) thick stainless steel blades with approximately 0.5 mm wide by 1.0 mm deep notches cut in them to match the midpoint of the slots 23. The blades 71 can be approximately 0.004 inches to facilitate multiple cycles of decapitation (e.g., 200-300 cycles or more). The closest blade 71 to the cartridge 20 is stationary while the further blade 71 can be manually actuated by pressing a button 77 on the side of the device. This action causes the mosquito neck 13 to be caught between the two blades 71 and cut. This experimental setup closely reflects the current arrangement of the robotic pick-and-place apparatus 80 of the robotic pick-and-place subsystem 88 with respect to the staging subsystem 82 and the dissection subsystem 83, which can use a modified sAMMS cartridge 20 and decapitation blades 71 for decapitation and transport of decapitated bodies for further processing. However, other configurations involving one or more moving blades may also be used, so long as their effect is to sever the neck 13 of the mosquito.

The blade 71 can be manually actuated. A successful placement by robotic pick-and-place apparatus 80 can be if the mosquito's neck 13 was placed into the notch of the dissection blades 71 such that the head 12 could be removed. As a final step of the process, the robotic pick-and-place apparatus 80 pulls away from the blade 71, moving the head 12, if still in its grasp, to a location where it can be cleaned off with a modest jet of air or other fluid that does not disturb the tooltip calibration. Video footage from computer vision apparatuses 30 can be recorded throughout and saved for analysis. The commanded speed of each robotic pick-and-place apparatus 80 axis can be approximately 12.5 mm/s, chosen to achieve rapid movements with negligible overshoot. The speed can be decreased to approximately 2.5 mm/s when lowering the mosquito neck 13 into the blades 71, reducing the inertia of the mosquito and thus the tendency to pivot or flip over the blades 71 rather than settle between them. As above, these distances and speeds are typical but not critical. They can be modified so long as the robotic pick-and-place apparatus 80 is able to perform the required pick-and-place procedure.

Any convenient method can be used to remove the head 12 of the mosquito. In an embodiment, a pair of cutting blades 71 can be used, as in the sAMMS apparatus [14, 15]. When the blades 71 of the decapitation station 85 are "open" the mosquito's neck 13 is placed in a small slot between the blades 71. One or both of the blades 71 can then be actuated to close the slot, thus severing the mosquito's neck 13. However, other alternative methods known in the art can also be used, including a laser, small water jet, or air jet. In this case, the blades 71 would not be needed, and the laser or jet would be aimed at the mosquito's neck 13. As shown in FIG. 20, in some embodiments, the blades 71 can include a sliding blade to move against a fixed blade.

Extrusion Subsystem with Salivary Gland Extrusion Apparatus

With reference to FIG. 22, in some embodiments, a cartridge 20 can be positioned adjacent to the turntable 16 during the pick and place and decapitation steps of the procedure. A linear transport apparatus 120 within the dissection subsystem 83 in these embodiments may move the cartridge so that mosquitoes containing decapitated mosquito bodies can be positioned at an extrusion station 50, a collection station 61, a combined extrusion/collection station 50, 61, and a cleaning/disposal station 68. These stations may be integrated together in various ways. For example, in FIG. 24, decapitated mosquitoes 8 move from the decapitation station 85 to a combined extrusion/collection station 50/60 and spent bodies move on to a cleaning/disposal station 68. In other embodiments, (e.g., FIG. 26) as the turntable 16 advances, it can bring a stall 7 with a decapitated mosquito 8 to the extrusion station 50. Once the mosquito body is positioned at the extrusion station 50, the mosquito thorax 11 can be squeezed to extrude the salivary glands for collection. A salivary gland extrusion apparatus 51 can include a squeezer 150, collection blade 151, and suction probe 152. The squeezer 150 and blade 151 can move together until the thorax 11 is compressed. The extruded material can be pipetted off, collected on tips of forceps, washed into a reservoir, and/or collected by a suction probe. Alternatively, a second salivary gland extrusion and collection apparatus 51 (e.g., a comb-like device) can be used to extrude and collect the salivary gland material from multiple mosquitoes.

In some embodiments a vision system can monitor the performance of the extrusion apparatus 51. In some assemblies, multiple mosquitoes can be aligned, decapitated, and dissected at once. The steel and/or disposable parts can be sterilized before use, such as with beam sterilization or gamma irradiation.

In some embodiments, the salivary gland extrusion apparatus 51 can minimize extra-glandular impurities (i.e., particle PfSPZ ratios). The squeeze combs of the salivary gland extrusion apparatus 51 can have a smaller surface area (to replicate the dimensions of the forceps tips/needles used for gland extrusion) and surface (that is in contact with mosquitoes) geometry to parallel the natural slant of a mosquito lying on its side. When operated, the salivary gland extrusion apparatus 51 can compare to the approximate pressure manually applied by operators. Finer consistencies in surface geometries and larger scale purification experiments can further minimize extra-glandular impurities. It may be advantageous to have separate squeezer geometries and/or squeezer apparatus depending on which side the mosquito is positioned. Computer vision can be used to determine this and an appropriate squeezer may be selected. Alternatively if several squeezer/collectors are placed by the turntable 16 or cartridge 20, the appropriate one may be actuated when the mosquito is positioned at it.

In some embodiments, as shown in FIG. 23, the salivary gland extrusion apparatus 51 can include a finger-like projection that can squeeze the thorax 11 for extrusion. A shaving blade can also be used to assist in collecting the extruded material. In some embodiments, the blades 71 shown in FIG. 20 can continue to move down the decapitated mosquito 8 while the salivary gland extrusion apparatus 51 is fixed to shave the extruded gland.

Cartridge Transport and Dissection Mechanism

With reference to FIG. 19, for the decapitation step at the decapitation station 85, the squeezing and collecting steps performed by the extrusion apparatus 51 and collection apparatus 60 and the cleaning/disposal steps performed in cleaning/disposal apparatus 67 in the sAMMS device, which can be incorporated into the disclosed device, the following steps are performed:

Step 1. Place a cartridge 20 into the apparatus track 261. Use the handle 27 on the cartridge to move the cartridge 20 proximate to the cutter assembly 40. Compress the springs sufficiently to permit the cartridge 20 to slide along the track 261 to the correct position relative to the cutter assembly 40 and release the handle 27 to engage a detent or stops to hold the cartridge 20 in the correct position for head 12 removal. Alternatively, the handle 27 can be released once the cartridge 20 is far enough into the track 261 so that it will slide smoothly along the track 261 until it reaches the correct position for head 12 removal.

Step 2. Transfer mosquitoes into the slots 23 of the cartridge 20. For each mosquito, grasp the mosquito by its proboscis 14 and place it into the slot 23 so that its neck 13 is engaged between the cutter blades 71. In doing this, it is helpful to lift the mosquito slightly when the head 12 gets close to the blades 71 and then lower it so that the neck 13 is in the proper position.

Step 3. Cut all the heads 12 off by pressing on the cutter assembly button 77 and releasing it.

Step 4. Disengage the cartridge 20 from the cutter assembly 40 by pulling back on the handle 27 and slide the cartridge 20 along the track 261 until it is properly positioned relative to the thorax 11 in the extrusion station 50.

Step 5. In the extrusion station 50, with the salivary gland extrusion apparatus 51, press down on the thorax 11 to squeeze the salivary glands out of the thoraces 11. The salivary glands can be collected in the collection station 61. If necessary, one can use lavage from a squeeze bottle or other source to wash any glands that have remained stuck to the cartridge 20 into the collection station 61. If the collection station 61 is full, empty it into a collecting container. Alternatively, one can modify the apparatus so that the salivary glands and fluid can be suctioned into a collecting container or collecting system, or the collection station 61 can be modified so that the glands and fluid flow continuously into a collecting system.

Step 6. Optionally, brush or wash the heads from the blades 71.

With reference to FIG. 24, in an embodiment of the instant invention, the combined mosquito staging and dissection system can include a modified sAMMS cartridge 20 mounted on a motorized linear stage. The gripper mechanism 81 locates the mosquito properly in the decapitation station 85, where the head 12 is decapitated and removed. The transport mechanism 52 transports the cartridge 20, containing the decapitated mosquito bodies 8, between the decapitation station 85 to a combined extrusion/collection station 50, 60, where the salivary glands are extruded and collected. The cartridge 20 is then transported to the disposal station 68 of the dissection subsystem 83 with the used carcasses 9, while also permitting these steps to be carried on concurrently. The cartridge 20 provides small "stalls" separated by walls to constrain the mosquito bodies 10. The stage motion is controlled by a servo-motor driving a lead screw and is capable of positioning the apparatus to very high precision. The number of stalls can be chosen for convenience in optimizing throughput and the overall dimensions of the system. The three stations are positioned relative to the transport mechanism 52 so that slots 23 of cartridge 20 are aligned with the decapitation station 85, extrusion station 50, and collection station 61.

In some embodiments, the basic workflow for the combined mosquito staging and dissection system is illustrated in FIG. 24. The following steps are performed concurrently:

The gripper mechanism 81 of the robotic pick-and-place apparatus 80 places a mosquito in the stalls of the cartridge 20 so that its neck 13 is between the decapitation blades 71 of the decapitation apparatus 84, the blades 71 are actuated to decapitate the mosquito, and the robotic pick-and-place apparatus 80 discards the head 12 and proboscis 14;

The oriented mosquito 10 within the cartridge 20 is linearly transported to the extrusion/collection station 50,60, where the salivary gland extrusion apparatus 51 squeezes the thorax 11 of the mosquito to extrude the salivary glands, and the glands are collected by the collection apparatus 61; and The cartridge 20 containing the used carcass 9, the mosquito body minus salivary gland, is linearly transported to the cleaning/disposal station 68, which washes the used carcass 9 from a cartridge slot 23.

The cartridge 20 is then advanced by one cartridge stall position and the process is repeated. When the end of the cartridge 20 is reached, it is moved back to the other end (much as is done with a typewriter carriage) and the process continues.

In some embodiments, it can be desirable to modify the position of the blades 71 relative to the stall slots 23, based on whether the mosquito is lying on its left or right side. The robotic pick-and-place apparatus 80 can be adapted readily to do this. In this case, rather than having a single target blade 71/slot 23 opening, it can be desirable to have a pair of slots 23 side-by-side with the blades 71 positioned for either "left lying" or "right lying" mosquitoes. The computer vision system 29 can determine whether a mosquito is "left lying" or "right lying", e.g., lying on its left side or lying on its right side, respectively. In this case, the robotic pick-and-place apparatus 80 would select the appropriate slot 23 based on input from the computer vision apparatus 30. The decapitation apparatus 84 can either actuate both sets of blades 71 or only the blades 71 with a mosquito. The cartridge 20 can then be advanced two slot 23 positions. The combined extrusion/collection station 50, 60 can be adapted readily to perform a squeeze/collect operation in a pair of slots 23 or selectively in whichever slot 23 has a mosquito in it. The cleaning/disposal apparatus 67 in cleaning/disposal station 68 can be easily adapted to flush two slots 23 containing used carcasses 9 simultaneously. This arrangement would prevent a potential slow-down that can occur if the cartridge 20 only advances one slot position at a time if the left-right lying selection is done. In this case, it can be desirable to lengthen the cartridge 20 somewhat to further reduce the proportion of time waiting for the carriage return action. It will be readily apparent that this method can be used whether the components of the dissection system are arranged around the periphery of a turntable 16 with stalls (as shown in FIG. 3 and FIG. 26) or adjacent to a moving cartridge 20 (as shown in FIG. 1, FIG. 5, and FIG. 22).

The combined extrusion/collection station 50, 61 is responsible for squeezing the thorax 11 of a decapitated mosquito to extrude the salivary gland and then to collect the extruded material.

As shown in FIG. 25, in another example, the squeezing process can be an automated version of that used in the sAMMS system [14, 15], and various methods can be used for gland collection. The squeezing apparatus is mounted on the same backplate as the decapitation apparatus 84 and requires adequate alignment of the backplate with the cartridge 20. This module consists of a press component, razor blade substrate, razor blade, housing, cylindrical cam (with two 3 mm dowels positioned 45 degrees apart), vacuum needle, and servo motor. This component achieves its function by having the razor substrate and press component interacting with the same rotating cam component by means of slots. As such, the cam is mounted onto the servo motor and the dowels are positioned at different radii from the center of the cam and at different lengths protruding away from the motor. The housing provides normal force to the substrate and press to constantly maintain alignment of the components in the lateral plane enabling motion only in the vertical plane. Additionally, the slots on the press and substrate make it possible for the lateral motion to be decoupled but maintain the vertical motion of the components when actuated by the cam. As such, by interfacing the substrate on the external and shorter dowel, and the press on the internal and longer dowel, different vertical motion is observed between the two effector components. The assembly is initialized such that the press will move a greater distance first, followed by the substrate that lags behind the motion of the press. This construction of this component and the anticipated motion is depicted in FIG. 25. This accomplishes two steps with a single servo motion, first pressing/squeezing the mosquito and then almost instantaneously the microdissection of the exudate by the razor blade from the mosquito body. The coupling motion enables both the squeezing and cutting be actuated by the same servo.

The collection aspect can be accommodated for a by a precisely placed 16 gage needle attached to vacuum to collect the exudate. The razor blade provides a secondary dissection step which dissociates the exudate from the mosquito body. This step enables the removal of the exudate from the razor blade by means of suction. However, other methods for collection can also be used. For example, a flow of a suitable liquid medium can be used to wash the exudate from the blades 71 and/or from the face of the cartridge 20 and salivary gland extrusion apparatus 51.

Head Disposal Station with Head Disposal Apparatus

The head disposal apparatus 167 in the head disposal station 168 can be responsible for removing the decapitated mosquitoes 8 after the dissection, exudate extrusion, and exudate collection step. After decapitation, the robotic pick-and-place apparatus 80 can move the gripper mechanism 81 (which still holds the proboscis 14 and head 12) to the collection station 61 for discard and releases them for disposal. The disposal apparatus 160 can use a jet of liquid or air to assist in removing any mosquito parts that still adhere to the gripper mechanism 81. The robotic pick-and-place apparatus 80 then moves the gripper mechanism 81 to a position to begin the next pick-and-place cycle.

Any additional suitable designs can be used to accomplish this purpose for any of the components in the combined mosquito staging and dissection system. One embodiment uses three 16-gage needles that are pointed at the midpoint of the slot 23 of the cartridge 20. A stream of water from one or more of the needles, followed by jets of air, are used to wash the mosquito body and any debris from the cartridge 20. In some embodiments, the computer vision apparatus 30 can include a camera positioned at the collection station 61 to monitor cleaning.

Cleaning/Disposal Station with Cleaning/Disposal Apparatus

With reference to FIG. 26, in some embodiments, the cleaning station 68 can include the cleaning apparatus 67, which can remove the used carcass 9 and any other debris from the gripper mechanism 81 or stall 7 for disposal by the collection station 61. The used carcass 9 and other debris can be removed by a combination of washing and physical brushing. In some embodiments, the cleaning apparatus 67 can include a rotary cleaning brush with vertical motion, air dispensers, water dispensers, and/or a head suction system.

With reference to FIGS. 4-5, in some embodiments, the carousel and/or cup cleaning station 70 can include a cleaning apparatus that can wash any mosquitoes that cannot be reoriented for pickup from the cups 17. The mosquitoes can be added to the bowl 18 of the dispensing apparatus 86. This situation can arise when more than one mosquito has been dispensed into a single cup 15 or if a mosquito is too badly damaged to be picked up. In some embodiments, the computer vision system 29 can include a computer vision apparatus 30 positioned at the cleaning station 68 and/or the turntable cleaning station 70 to monitor cleaning.

The disclosed embodiments represent a combined mosquito staging and dissection system to align and orient mosquitoes, decapitate mosquitoes, and extrude salivary glands to be able to use the resident live parasites and produce a whole-organism eukaryotic vaccine against a devastating parasitic disease, all under strict cGMPs for human pharmaceutical use.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

REFERENCES

[1] WHO, "World Malaria Report, 2018", 2018, https://www.who.int/malaria/publications/world-malaria-report-2018/report/en/.

[2] M. P. Heron, "Deaths: Leading causes for 2016", *Natl Vital Stat Rep*, vol. 67-6, pp. 1-76, 2018.

[3] WHO, "Global technical strategy for malaria 2016-2030", 2015, https://www.who.int/malaria/publications/atoz/9789241564991/en/.

[4] S. Hoffman, P. Billingsley, et al., "Development of a metabolically active, non-replicating sporozoite vaccine to prevent *Plasmodium falciparum* malaria", *Hum Vaccin*, vol. 5-1, p. 97=106, 2010.

[5] A. S. Ishizuka, K. E. Lyke, et al., "Protection against malaria at 1 year and immune correlates following PfSPZ vaccination", *Nat Med*, vol. 22-6, pp. 614-23, June, 2016. 10.1038/nm.4110

[6] J. E. Epstein, K. M. Paolino, et al., "Protection against *Plasmodium falciparum* malaria by PfSPZ Vaccine", *JCI Insight*, vol. 2-1, p. e89154, Jan. 12, 2017. 10.1172/jci.insight.89154

[7] M. S. Sissoko, S. A. Healy, A. Katile, F. Omaswa, I. Zaidi, E. E. Gabriel, B. Kamate, Y. Samake, M. A. Guindo, and e. a. A. Dolo, "Safety and efficacy of pfspz vaccine against *Plasmodium falciparum* via direct venous inoculation in healthy malaria-exposed adults in mali: a randomised, double-blind phase 1 trial", *The Lancet Infectious Diseases*, vol. 17-5, pp. 498-509, 2017.

[8] K. E. Lyke, A. S. Ishizuka, A. A. Berry, S. Chakravarty, A. DeZure, M. E. Enama, E. R. James, P. F. Billingsley, A. Gunasekera, A. Manoj, and e. al., "Attenuated pfspz vaccine induces strain-transcending t cells and durable protection against heterologous controlled human malaria infection", *Proceedings of the National Academy of Sciences*, vol. 114-10, pp. 2711-2716, 2-17.

[9] B. Mordmüller, G. Surat, et al., "Sterile protection against human malaria by chemoattenuated PfSPZ vaccine", *Nature*, vol. 542-7642, pp. 445-449, Feb. 23, 2017.

[10] T. Bousema and C. Drakeley, "Epidemiology and infectivity of *Plasmodium falciparum* and *Plasmodium vivax* gametocytes in relation to malaria control and elimination", *Clinical microbiology reviews*, vol. 24-2, pp. 377-410, 2011.

[11] ____, "SporoBot—Build a Robot. Fight Malaria. Save Lives! (YouTube video)": Sanaria, Inc, 2014, https://www.youtube.com/watch?feature=player_embedded&v=VblazNXcHFg.

[12] I. Lapowsky, "The Next Big Thing You Missed: This Mosquito-Dissecting, Malaria-Killing Robot Needs Your Help", *Wired*, 2014, http://www.wired.com/2014/06/the-next-big-thing-you-missed-a-crowdfunded-mosquito-dissecting-malaria-killing-robot/.

[13] C. Borchers, "Robot may help fight malaria", The Boston Globe, May 8, 2014. http://www.bostonglobe.com/business/2014/05/07/mosquito-harvest/Qxto58qtpGHhRVfliT6aH1/story.html

[14] U.S. patent application Ser. No. 15/621,875, filed Jun. 13, 2017; published Dec. 14, 2017 as US 2017/0355951 A1, R. H. Taylor, A. Canezin, M. Schrum, G. Chirikjian, M. Laskowski, S. Chakravarty, and S. Hoffman, "Mosquito Salivary Gland Extraction Device and Methods of Use".

[15] M. Schrum, A. Canezin, S. Chakravarty, M. Laskowski, S. Comert, Y. Sevimli, G. S. Chirikjian, Stephen L. Hoffman, and R. H. Taylor, "An Efficient Production Process for Extracting Salivary Glands from Mosquitoes", *arXIV*, 2019, http://arxiv.org/abs/1903.02532.

[16] J. Chanussot and P. Lambert, "Watershed approaches for color image segmentation", *NSIP*, vol. 99-, pp. 129-133, 1999.

[17] H. Yuen, J. Princen, J. Illingworth, and J. Kittler, "Comparative study of hough transform methods for circle finding", *Image and vision computing*, vol. 8-1, pp. 71-77, 1990.

[18] H. K. M Ester, J Sander, X Xu, "A density-based algorithm for discovering clusters in large spatial databases with noise", *Kdd*, vol. 96-34, pp. 226-231, 1996.

[19] J. Matas, C. Galambos, and J. Kittler, "Robust detection of lines using the progressive probabilistic hough transform", *Computer Vision and Image Understanding*, vol. 78-1, pp. 118-137, 2000.

[20] K. He, G. Gkioxari, P. Doll, and R. Girshick, "Mask r-cnn", in IEEE International Conference on Computer Vision (ICCV), 2017. pp. 2980-2988.

[21] T.-Y. Lin, P. Doll, R. Girshick, K. He, B. Hariharan, and S. Belongie, "Feature pyramid networks for object detection", in IEEE Conference on Computer Vision and Pattern Recognition (CVPR), 2017. p. 4.

[22] L. Pishchulin, E. Insafutdinov, S. Tang, B. Andres, M. Andriluka, P. V. Gehler, and B. Schiele, "Deepcut: Joint subset partition and labeling for multi person pose estimation", in IEEE Conference on Computer Vision and Pattern Recognition (CVPR), 2016. pp. 4929-4937.

[23] E. Insafutdinov, L. Pishchulin, B. Andres, M. Andriluka, and B. Schiele, "Deepercut: A deeper, stronger, and faster multi-person pose estimation model", in European Conference on Computer Vision (ECCV), 2016. pp. 34-50.

[24] A. Mathis, P. Mamidanna, K. M. Cury, T. Abe, V. N. Murthy, M. W. Mathis, and M. Bethge, "Deeplabcut: markerless pose estimation of user-defined body parts with deep learning", *Nature Neuroscience*, vol. 24-, pp. 1981-1989, 2018.

[25] H. Phalen, P. Vagdargi, M. Pozin, S. Chakravarty, G. S. Chirikjian, I. Iordachita, and R. H. Taylor, "Mosquito Pick-and-Place: Automating a Key Step in PfSPZ-based Malaria Vaccine Production", in IEEE Conference on Automation Science and Engineering (CASE), Vancouver, BC, Aug. 22-26, 2019. pp. 12-17.

[26] H. Wu, J. Mu, T. Da, M. Xu, R. H. Taylor, I. Iordachita, and G. S. Chirikjian, "Multi-mosquito object detection and 2D pose estimation for automation of PfSPZ malaria vaccine production", in IEEE 15th International Conference on Automation Science and Engineering (CASE), Vancouver, BC, Aug. 22-26, 2019. pp. 411-417.

[27] M. Xu, S. Lyu, Y. Xu, C. Kocabalkanli, B. K. Chirikjian, J. S. Chirikjian, J. Davis, J. S. Kim, I. Iordachita, R. H. Taylor, and G. S. Chirikjian, "Mosquito Staging Apparatus for producing PfSPZ Malaria Vaccines", in IEEE 15th International Conference on Automation Science and Engineering (CASE), Vancouver, BC, Aug. 22-26, 2019. pp. 443-449.

[28] H. Phalen, P. Vagdargi, M. L. Schrum, S. Chakravarty, A. Canezin, Michael Pozin, S. Coemert, I. Iordachita, S. L. Hoffman, G. S. Chirikjian, and R. H. Taylor, "A Mosquito Pick-and-Place System for PfSPZ-based Malaria Vaccine Production", IEEE Trans. Automation Science and Engineering, (to appear in special issue) Oct. 1, 2020. Can 20 Can 20. http://arxiv.org/abs/2004.05702 10.1109/TASE.2020.2992131; arXiv:2004.05702

What is claimed is:

1. A system for dissecting mosquitoes, comprising:
   a rotatable turntable having an outer edge and a central area;
   a plurality of stalls arranged radially on the rotatable turntable, each stall comprising an open leading end proximate to the outer edge and an open trailing end distal from the outer edge, each stall structurally configured to receive a mosquito having a proboscis, a head, a neck, and a thorax;
   a computer vision system comprising a camera configured to detect at least one of a presence, a position, and an orientation of the mosquito within one of the plurality of stalls on the turntable;
   a decapitation station arranged around the periphery of the turntable, the decapitation station comprising blades, wherein a decapitated mosquito is the mosquito without the proboscis and the head;
   an extrusion/collection station arranged around the periphery of the turntable after the decapitation station and configured to receive the decapitated mosquito, the extrusion/collection station comprising a squeezer comb having finger-like projections configured to compress the thorax of the decapitated mosquito to extrude the salivary gland; and
   a cleaning/disposal station arranged around the periphery of the turntable after the extrusion/collection station, the cleaning/disposal station having a bin to collect the decapitated mosquito.

2. The system of claim 1, wherein each stall comprises an open area between the open leading end and the open trailing end to receive a mosquito.

3. The system of claim 2, wherein each open area of each of the stalls narrows toward the outer edge of the rotatable turntable such that the mosquito is constrained within the stall.

4. The system of claim 1, wherein the proboscis of the mosquito is positioned at a leading edge of one of the plurality of stalls.

5. The system of claim 2, wherein the camera is an overhead camera positioned above the rotatable turntable.

6. The system of claim 1, further comprising a robotic pick-and-place apparatus having a gripper mechanism to transfer a mosquito from an open repository containing a plurality of mosquitos to a stall.

7. The system of claim 1, wherein the rotatable turntable is rotatable to advance the mosquito through each of the decapitation station, the extrusion/collection station, and the cleaning/disposal station.

8. The system of claim 6, wherein the gripper mechanism is configured to dispose the head and the proboscis of the decapitated mosquito into the bin.

9. The system of claim 1, wherein the comprising a second camera configured to detect at least one of a presence, a position, and an orientation of the mosquito within one of the plurality of stalls on the turntable.

10. The system of claim 1, further comprising:
a robotic pick-and-place apparatus configured to transfer the mosquito to the decapitation station.

11. The system of claim 1, wherein the blades to decapitate the mosquito comprise slots configured to receive the neck of the mosquito.

12. The system of claim 1, wherein the camera is further configured to detect a position of at least one of the head and the neck of the mosquito at the decapitation station and to determine on which side the mosquito is lying.

13. A system for extracting salivary glands from a mosquito, comprising:
a rotatable turntable to transport a mosquito to different positions around the turntable;
a camera arranged around the periphery of the turntable to detect at least one of a presence and an orientation of the mosquito;
a robot arranged around the periphery of the turntable to grasp the mosquito and orient it for decapitation at a first position around the turntable;
one or more blades to decapitate the mosquito at the first position;
a squeezer comb having finger-like projections configured to squeeze the mosquito and collect salivary glands of the mosquito at a second position around the turntable, the second position separate from the first position; and
a disposal station arranged around the periphery of the turntable and comprising a bin to receive the mosquito after its salivary glands are collected,
wherein the turntable is configured to rotate to move from the first position to the second position.

* * * * *